(12) United States Patent
Braun et al.

(10) Patent No.: US 11,761,403 B2
(45) Date of Patent: Sep. 19, 2023

(54) CHARGE FORMING DEVICE WITH TAMPER RESISTANT ADJUSTABLE VALVE

(71) Applicant: Walbro LLC, Cass City, MI (US)

(72) Inventors: Matthew A. Braun, Caro, MI (US); Eric L. King, Caro, MI (US)

(73) Assignee: Walbro LLC, Cass City, MI (US)

( * ) Notice: Subject to any disclaimer, the term of this patent is extended or adjusted under 35 U.S.C. 154(b) by 14 days.

(21) Appl. No.: 17/496,184

(22) Filed: Oct. 7, 2021

(65) Prior Publication Data

US 2022/0025838 A1 Jan. 27, 2022

Related U.S. Application Data

(62) Division of application No. 15/622,583, filed on Jun. 14, 2017, now Pat. No. 11,187,191.

(60) Provisional application No. 62/353,744, filed on Jun. 23, 2016.

(51) Int. Cl.
*F02M 7/14* (2006.01)
*F16B 41/00* (2006.01)
*F02M 3/10* (2006.01)

(52) U.S. Cl.
CPC ............ *F02M 7/14* (2013.01); *F02M 3/10* (2013.01); *F02M 2003/105* (2013.01); *F16B 41/005* (2013.01)

(58) Field of Classification Search
CPC ...... F02M 7/14; F02M 3/10; F02M 2003/105; F16B 41/005
See application file for complete search history.

(56) References Cited

U.S. PATENT DOCUMENTS

| 4,283,353 A | * | 8/1981 | Miller | F16B 41/005 261/DIG. 38 |
| 4,392,633 A | * | 7/1983 | Van Winkle | E21B 33/062 251/223 |
| 4,752,420 A | * | 6/1988 | Nagasaka | F02M 17/04 261/DIG. 68 |
| 5,252,261 A | * | 10/1993 | Gerhardy | F02M 3/10 261/DIG. 38 |

(Continued)

FOREIGN PATENT DOCUMENTS

| CN | 2119507 U | 10/1992 |
| CN | 1702312 A | 11/2005 |

(Continued)

OTHER PUBLICATIONS

Design for Assembly; Santa Clara University Engineering Design Center dated Jun. 20, 2014; 9 pages.

(Continued)

*Primary Examiner* — Stephen Hobson
(74) *Attorney, Agent, or Firm* — Reising Ethington P.C.; Matthew J. Schmidt

(57) ABSTRACT

In at least some implementations, a locking plate may be received between the cover plate and the adjustable valve and be movable to a first position permitting access to the adjustable valve and a second position inhibiting or preventing access to the adjustable valve. In some implementations, a latch assembly may releasably retain the locking plate in its second position. The latch assembly may include a finger carried by the locking plate and releasably engageable with a stop when the locking plate is in its second position.

13 Claims, 17 Drawing Sheets

(56) References Cited

U.S. PATENT DOCUMENTS

| | | | | |
|---|---|---|---|---|
| 5,525,267 A * | 6/1996 | Araki | | F02M 3/10 |
| | | | | 261/DIG. 38 |
| 5,707,561 A * | 1/1998 | Swanson | | F02M 3/10 |
| | | | | 261/DIG. 38 |
| 5,753,148 A * | 5/1998 | King | | F02M 3/08 |
| | | | | 261/DIG. 38 |
| 5,772,927 A * | 6/1998 | Koizumi | | F02M 19/04 |
| | | | | 261/DIG. 38 |
| 5,948,325 A * | 9/1999 | Yanaka | | F02M 19/04 |
| | | | | 261/DIG. 38 |
| 5,984,281 A * | 11/1999 | Hacker | | F02M 3/08 |
| | | | | 261/DIG. 38 |
| 6,467,757 B1 * | 10/2002 | Douyama | | F02D 11/04 |
| | | | | 137/382 |
| 6,796,551 B2 * | 9/2004 | Warfel | | F02M 3/10 |
| | | | | 137/382.5 |
| 7,070,173 B2 * | 7/2006 | Dow | | F02M 3/10 |
| | | | | 261/DIG. 38 |
| 7,097,164 B2 * | 8/2006 | Vick | | F02M 3/08 |
| | | | | 261/DIG. 38 |
| 7,097,165 B1 * | 8/2006 | Braun | | F02M 3/10 |
| | | | | 137/382.5 |
| 7,121,533 B2 * | 10/2006 | Warfel | | F02M 3/10 |
| | | | | 55/DIG. 28 |
| 7,240,896 B1 * | 7/2007 | Gliniecki | | F02M 3/10 |
| | | | | 261/DIG. 38 |
| 7,475,871 B2 * | 1/2009 | Terakado | | F02M 9/02 |
| | | | | 261/44.8 |
| 8,286,614 B2 * | 10/2012 | Zbytowski | | F02M 19/04 |
| | | | | 137/382.5 |
| 8,348,244 B2 * | 1/2013 | Kojima | | F02M 7/12 |
| | | | | 261/DIG. 38 |
| 8,544,829 B2 * | 10/2013 | Baumhauer | | F02M 3/02 |
| | | | | 137/382.5 |
| 10,072,615 B2 * | 9/2018 | Pattullo | | B25B 23/105 |
| 10,738,741 B2 * | 8/2020 | Doyama | | F02M 19/04 |
| 2001/0026025 A1 * | 10/2001 | Nagata | | F02M 19/04 |
| | | | | 261/DIG. 38 |
| 2012/0018908 A1 * | 1/2012 | Kojima | | F02M 7/18 |
| | | | | 261/DIG. 38 |
| 2017/0363045 A1 * | 12/2017 | Doyama | | F02M 19/04 |
| 2018/0023514 A1 * | 1/2018 | Nagata | | F02M 19/04 |
| | | | | 261/66 |
| 2018/0252185 A1 * | 9/2018 | Suzuki | | F02M 19/04 |
| 2022/0074236 A1 * | 3/2022 | Lee, Jr. | | B60D 1/60 |

FOREIGN PATENT DOCUMENTS

| | | |
|---|---|---|
| CN | 1847635 A | 10/2006 |
| CN | 1873208 A | 12/2006 |
| CN | 102536518 A | 7/2012 |
| EP | 2492485 A1 | 8/2012 |
| JP | H102254 A | 1/1998 |

OTHER PUBLICATIONS

CN Office Action for CN Application No. 201710480692.8 dated Mar. 27, 2020; 13 pages.

* cited by examiner

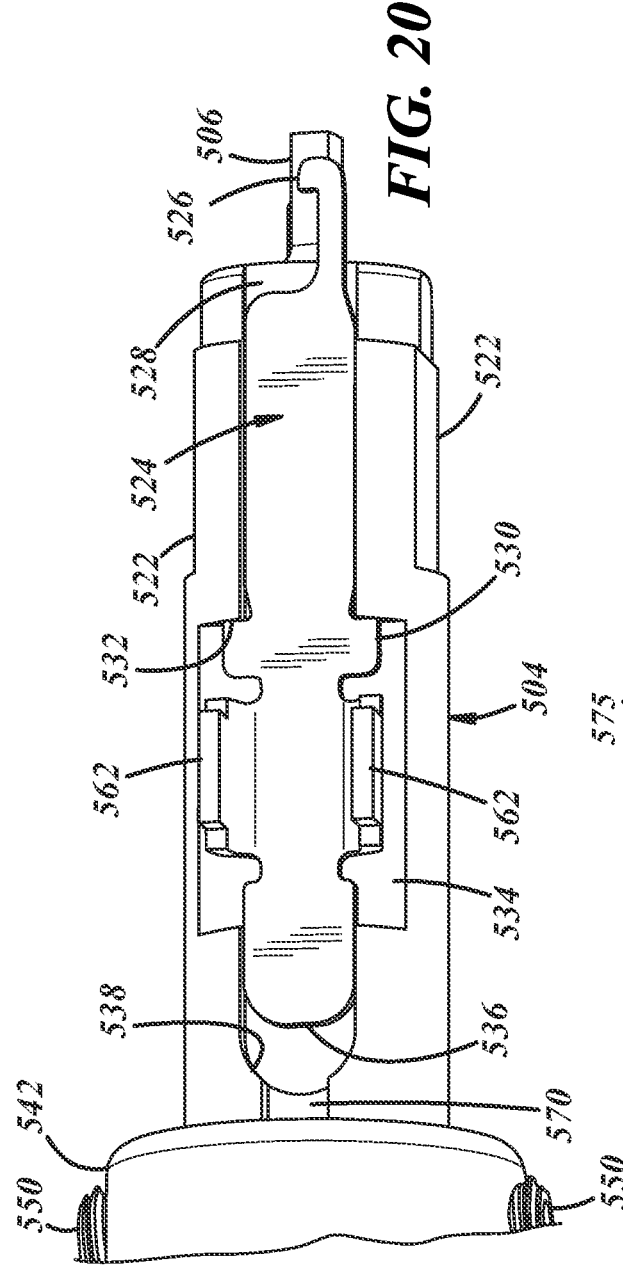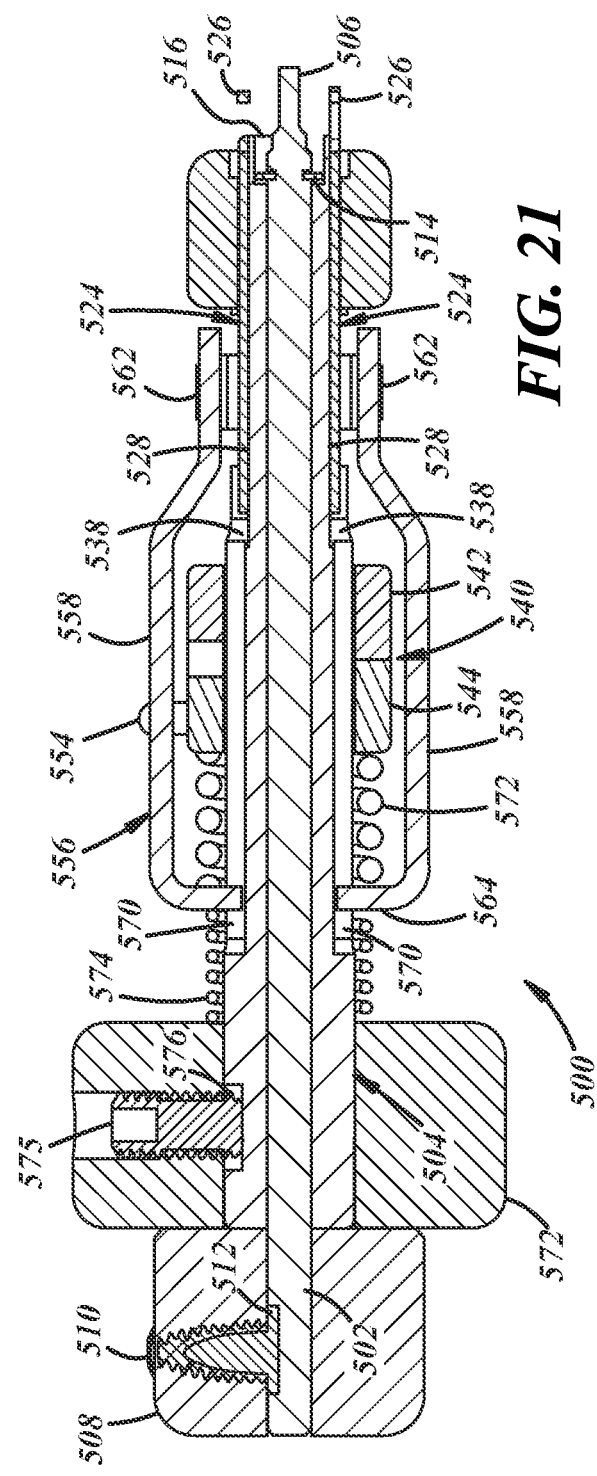

CHARGE FORMING DEVICE WITH TAMPER RESISTANT ADJUSTABLE VALVE

REFERENCE TO RELATED APPLICATIONS

This application is a divisional of U.S. patent application Ser. No. 15/622,583 filed Jun. 14, 2017 and claims the benefit of U.S. Provisional Application No. 62/353,744 filed Jun. 23, 2016. The entire contents of these priority applications are incorporated herein by reference in their entireties.

TECHNICAL FIELD

The present disclosure relates generally to a charge forming device having an adjustable valve, the adjustment of which by an end user may be limited.

BACKGROUND

Government agencies of an increasing number of countries are applying exhaust emission control regulations to protect the environment. These regulations are being applied to all gasoline fuel combustion engines including engines used in marine, lawn and garden and recreational equipment such as outboard motors, garden tractors, chain saws, lawn mowers, hedge trimmers, snowmobiles and personal watercraft. One means of limiting excessive exhaust emissions in a small engine is to restrict the maximum amount of fuel delivered to the combustion chamber by a charge forming device such as a carburetor. This maximum fuel amount is pre-set for each individual engine by the engine manufacturer with the understanding that the end user requires some adjustment capability to meet changing work conditions and environmental factors such as altitude and ambient temperature. The higher the altitude and temperature, the lower the air density, and thus the amount of fuel mixed with the air must be decreased to maintain the proper oxygen to fuel ratio necessary to efficiently operate the engine. The user of the engine must therefore be able to adjust the fuel to air mixture ratios and may do so via low and high speed needle valves of the carburetor.

Not only is it desirable to limit the richness of the fuel-to-air mixture because of exhaust emission regulatory concerns, but the engine manufacturer of a two-cycle engine product also wants to restrict minimum amounts of fuel, or the leanness of the fuel to air mixture. Often a user will desire more power from a two-cycle engine and will attempt to operate the engine in an ultra-lean state. This will cause a two-cycle engine to operate at a temperature higher than its design temperature and may decrease its useful life and lead to service and warranty concerns. Therefore, known limiter caps are designed not only to restrict the carburetor to a maximum amount of fuel, but also to restrict the carburetor to a minimum amount of fuel.

Limiter caps secured to the projecting ends of the low and high speed needle valves are commonly used to restrict the end user from demanding too much fuel from a carburetor which could exceed regulatory emission limits. The user purchases the engine already factory set to a desired fuel amount, adequate for efficient operation in low lying areas. Should the engine be utilized in a high altitude area, the user can still decrease the amount of fuel supplied to compensate for the low air density and/or ambient temperature.

In a conventional needle valve, the valve has an enlarged metallic head having an outward end face that defines a diametric recess or slot for receipt of a tool or blade of a screwdriver to rotate the valve to adjust fuel flow. The limiter cap has a similar diametric recess or hole in an end wall for access of the screwdriver, and a continuous inner surface defining a bore for receipt of the head. The inner surface may have serrations which axially mate with serrations on the head so the limiter cap when in a user assembled state rotates in unison with the head. Typically, a peripheral side or outer surface of the limiter cap has at least one radially projecting tab which engages at least one stop of the carburetor body in both the fuel rich and fuel lean directions and thereby limits fuel adjustment capability by the end user.

Due to carburetor and engine design and manufacturing tolerances, a manufacturer's setting of a specific carburetor to an optimum fuel amount prior to use on a specific engine, or within a specific environment such as altitude, is not practical. The limiter cap assembly is therefore supplied in a non-engaged mode in which the cap is not mated to the needle valve head and is often separate from the carburetor itself. Unfortunately, supplying a carburetor with unassembled parts contributes to manufacturing or assembly inefficiencies and possible regulatory violations if the caps are never actually fully engaged to the valves.

Other needle valve assemblies, such as that disclosed in U.S. Pat. No. 6,467,757, to Douyama, and incorporated herein by reference, have a limiter cap which is pre-engaged to the carburetor body by the carburetor manufacturer for delivery to the engine manufacturer who then engages and locks the limiter cap to the valve head after final adjustments are made during operation on a specific engine. Three axially spaced projections disposed on the outer surface of the limiter cap are required to press-fit and hold the cap in the pre-engaged position and then to press-fit and lock the cap in the engaged position. When pre-engaged, the limiter cap projects outward from the carburetor body and the valve head, and the unmated serrations of the valve head are spaced axially away from the serrations of the limiter cap. When the limiter cap is pre-engaged, a screwdriver blade is inserted through the cap hole for factory rotational adjustment of the needle valve while the limiter cap is unmated from the needle valve. Upon adjustment completion, the caps are press fitted directly over the needle valve head, mating the serrations and received in the carburetor body. Once engaged to the valve head, the end user has restricted adjustment of the needle valve by rotating the limiter cap which, in turn, rotates the needle valve.

Unfortunately, during factory adjustment, if a worker employee misses the elongated hole with the screwdriver, the limiter cap may inadvertently be pushed-in axially into engagement with the needle valve head and thereby prevent factory adjustment without destroying the cap by forcibly removing it. Furthermore, the press-fit between the cap projections and the carburetor body requires that the cap be made of a resilient synthetic resin material such as nylon or other resilient thermoplastic material.

SUMMARY

In at least some implementations, a carburetor may have a body with a cavity with an adjustable valve received therein. To inhibit and/or limit manual adjustment with a conventional tool by an end user, a cover may overlay at least part of the cavity. In some implementations, the cover may be a pin or a cover plate.

In at least some implementations, a locking plate, which may be a disk, may be received between the cover plate and the adjustable valve and be movable to a first position permitting access to the adjustable valve and a second position inhibiting or preventing access to the adjustable valve. In some implementations, a latch assembly may releasably retain the locking plate in its second position. The latch assembly may include a finger carried by the locking plate and releasably engageable with a stop when the locking plate is in its second position.

A specialty tool not readily available to an end user may have at least one arm insertable through the cover plate and engageable with the latch assembly to release it and a driver insertable through the cover plate and engageable with the locking plate to move it from its second position to its first position. In some implementations, the driver may be on an end of a shank and the at least one arm carried by the shank with the shank rotatable relative to the at least one arm.

In another implementation, a specialty tool not readily available to an end user may have a shank with a driver on one end and at least one arm or finger with a hook slidably carried by the shank for rotation therewith and a mechanism to advance and retract each hook relative to the driver. The driver and each hook may be inserted through the cover plate and the driver into engagement with the locking plate and each hook advanced and rotated to overlap a finger of the latch assembly and retracted to engage and move the finger to release the latch assembly and the shank rotated to move the locking plate from its second position toward its first position.

BRIEF DESCRIPTION OF THE DRAWINGS

The following detailed description of certain embodiments and best mode will be set forth with reference to the accompanying drawings, in which:

FIG. 20 is an enlarged fragmentary perspective view of one of the fingers received on the barrel of the tool of FIG. 18;

FIG. 21 is a sectional view of the assembled tool of FIG. 18;

DETAILED DESCRIPTION

Figure 1:
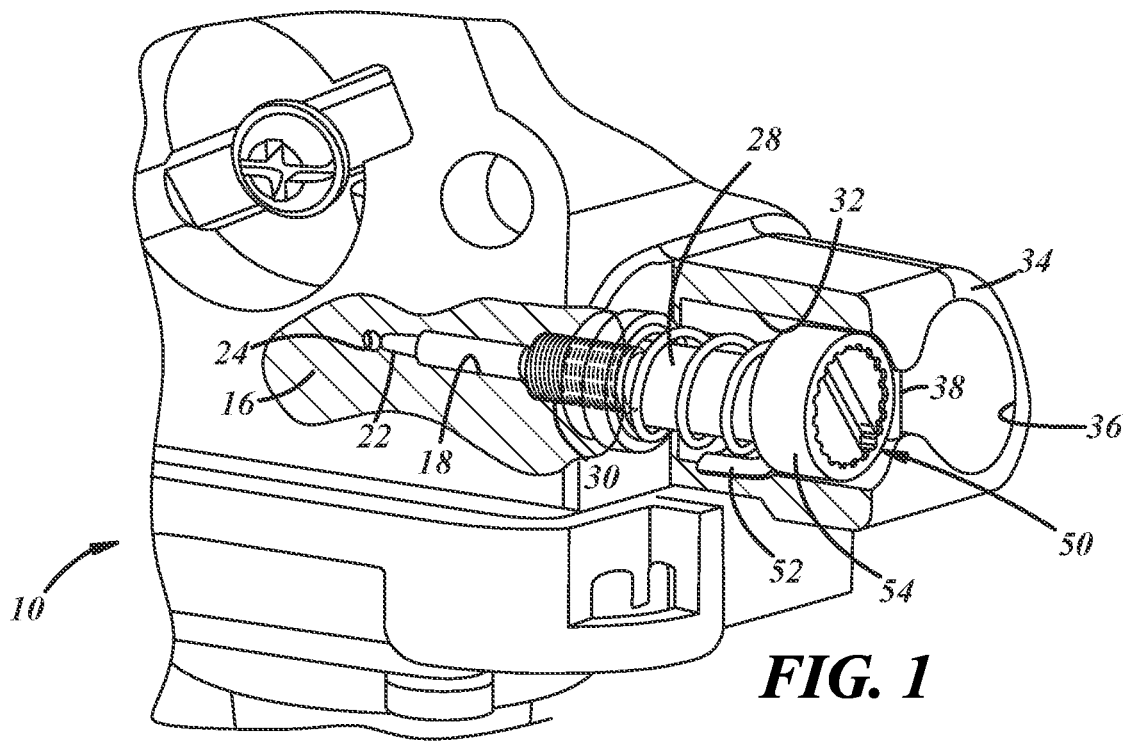
FIG. 1 is a fragmentary perspective view of a carburetor with a portion in section to show an adjustable needle valve carried by the carburetor, a second adjustable needle valve being removed for clarity.

Referring in more detail to the drawings, FIG. 1 shows a carburetor that provides a fuel and air mixture to an engine to support operation of the engine. The carburetor may be a diaphragm type carburetor, as shown, or any other air-fuel charge forming device suitable for use as described herein. The carburetor may be constructed and function as generally set forth in U.S. Pat. No. 4,752,420 which is incorporated herein by reference in its entirety. As will be described herein, the carburetor may have at least one adjustable valve that restricts the amount or flow rate of fuel delivered to the engine. The valve may be a needle valve that is axially displaced relative to a passage or opening in the carburetor through which fuel flows As illustrated in FIG. 1, the carburetor 10 may include at least one valve 12 adjustable to control the air and fuel mixture ratio. A body 16 of the carburetor 10 may have at least one needle valve passage 18 for receiving the valve 12. As shown in FIGS. 2-7, in the implementations shown, the carburetor includes two needle valves 12, 14 rotatably carried by the carburetor body 16 about center axes of the needle valves, and the needle valves are located in separate needle valve passages 18 in the carburetor body 16. Rotation of the needle valves 12, 14 in one direction advances the needle valves further into the carburetor body 16 and rotation in the other direction retracts the needle valve from the carburetor body. Such rotation of the needle valves 12, 14 moves a tip 22 of the needle valve relative to a port or passage 24 through which fuel flows in the carburetor body 16 to control the flow rate of fuel through that port or passage. In at least some implementations, one needle valve 12 controls fuel flow through part of a low speed fuel circuit and the other needle valve 14 controls fuel flow through part of a high speed fuel circuit. As shown in FIGS. 2-7, the needle valves 12, 14 may be arranged generally parallel to each other, side-by-side, and may be rotated independently of each other through at least a portion of their adjustment range. Each needle valve 12, 14 may have the same features and so only one needle valve 12 will be further described.

The needle valve 12 may include a head 26 at the opposite end as the tip 22, and a shank 28 between the tip 22 and head 26 with one of more threaded sections 30 that are received in threaded portions of the passage 18 so that the needle valve moves axially as it is rotated. The heads 26 may include an actuating feature engageable to permit rotation of the needle valves 12, 14. In the example shown in FIGS. 1-5, the actuating feature of the needle valve 12 includes a plurality of grooves or serrations 31 that extend axially about the periphery of a portion of the head 26 and may be engaged by a complementary tool to permit rotation of the needle valves. In the example shown in FIGS. 6 and 7, the head 26' includes a noncircular portion 31' that defines the actuating feature and which may be engaged by a complementary tool to permit rotation of the needle valve 12.

The carburetor body 16 may include a cavity 32 open to the passages 18 and into which the needle valves 12, 14 are received as they are assembled into the passages 18. The cavity 32 may be defined in a main block or plate of the carburetor or in an extension or projection 34 that extends outwardly from a side of the carburetor body as in the implementations shown. Such a projection 34 may be integrally formed from the same piece of material as another portion of the carburetor body 16 or it may be a separate piece fixed to the carburetor body. The cavity 32 is open at one end 36 or side opposite to the passages 18 but is otherwise enclosed by the carburetor body 16 (e.g. the projection 34). The open end 36 provides access to the heads 26 of the needle valves 12, 14 which are received in the cavity so that the actuating features of the needle valves may be accessed to facilitate rotation of the needle valves relative to the carburetor body 16. In the examples shown in the drawings, the actuating features 31 and 31' are adapted to be engaged by a tool received about the periphery of the heads 26, 26'. To permit a tool to be received around at least a portion of the heads (e.g. a tool with a socket that fits over the head), the cavity is sized to provide a gap between the heads 26, 26' and the adjacent walls of the carburetor body (e.g. projection 34). Likewise, a gap of sufficient size to accommodate such tools is also provided between the heads 26 of the adjacent needle valves 12, 14 (and 12', 14').

To inhibit tampering or adjustment of the needle valves after they have been put into a desired or calibrated position, a cover may be provided over at least part of the cavity. As shown in FIGS. 1-7, the cover includes one or more pins 38 that span a portion of the cavity 32. In the implementation shown, one pin 38 is used and it is arranged to span the cavity 32 in or axially overlapping the gap between the heads 26 of needle valves 12, 14. The pin 38 may be secured to the carburetor body 16 (e.g. projection 34) in any desired manner so that it is difficult or impossible to remove from the carburetor body 16 without destroying the pin. In the implementations shown, the pin 38 is inserted in a passage 40 that intersects the cavity 32 and extends through at least one wall of the cavity. As shown, the passage 40 extends through a first wall 42 (or first wall portion) and into but not through a second wall 44 (or second wall portion) on the opposite side of the cavity 32 (as shown the walls 42, 44 may be integrally joined if desired). While shown as being generally parallel to a centerline 46 of the gap between the heads 26, the pin 38 could be otherwise arranged in the cavity 32, including perpendicular to the centerline. Also in the implementation shown, the passage 40 intersects the cavity 32 inboard of the open end 36 and between the end of the heads 26 and the open end 36. The passage 40 may be a straight cylindrical bore sized for a close fit or an interference fit with the pin 38, and a portion of the pin may be deformed relative to the passage to inhibit removal of the pin from the passage. The pin 38 may likewise be generally cylindrical, such as a roll pin. If desired, a portion of all of the pin may be threaded and the passage may have complementary threads so that the pin is advanced in the passage by rotation. Other shapes and arrangements may be used—the cover could be a flat plate, triangular bar, or other shape received in a complementary passage or bore. The plate or other shape might radially overlap more of the heads 26 of the needle valves 12, 14, if desired.

Figure 2:
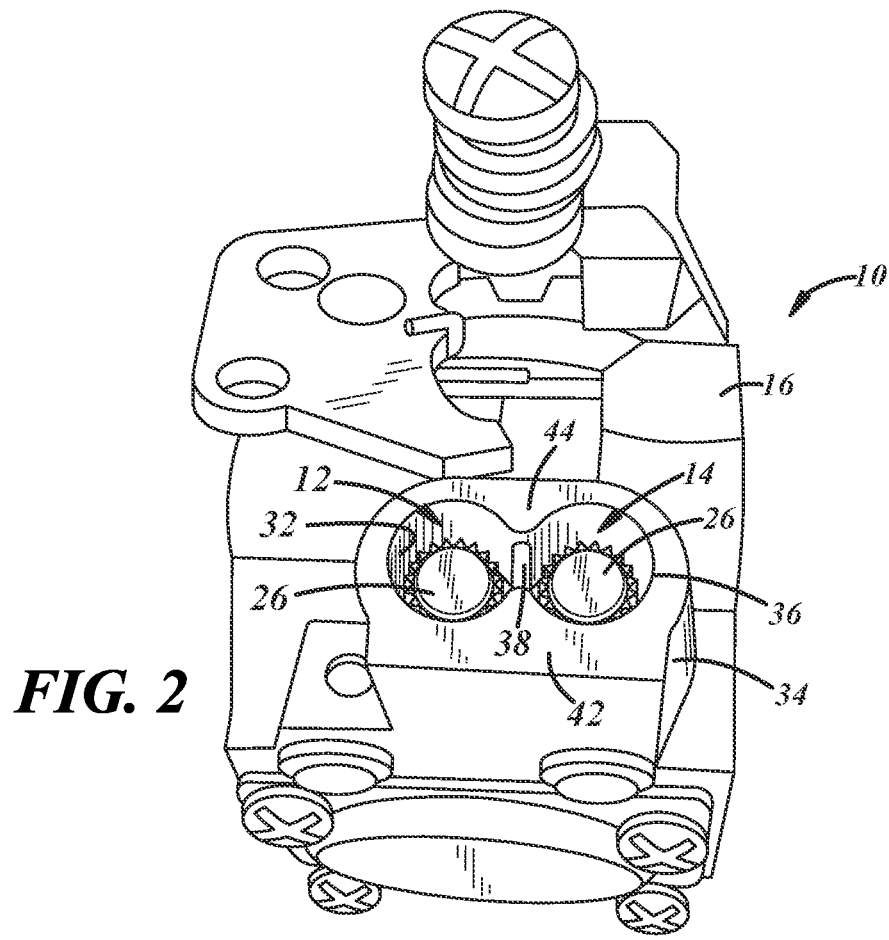
FIG. 2 is a perspective view of a carburetor having a pair of adjustable valves and a cover limiting access to the adjustable valves.
Figure 3:
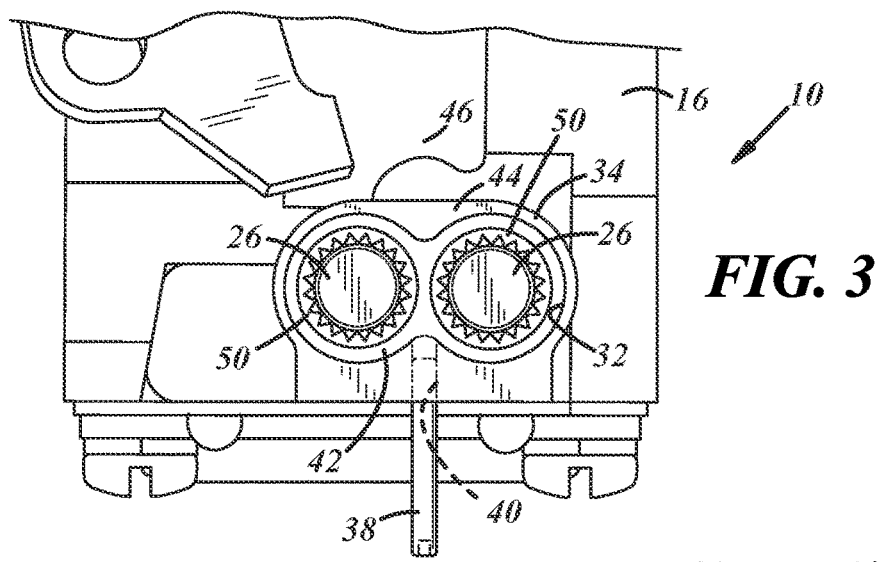
FIG. 3 is a side view of a portion of the carburetor showing the cover in a first position.
Figure 4:
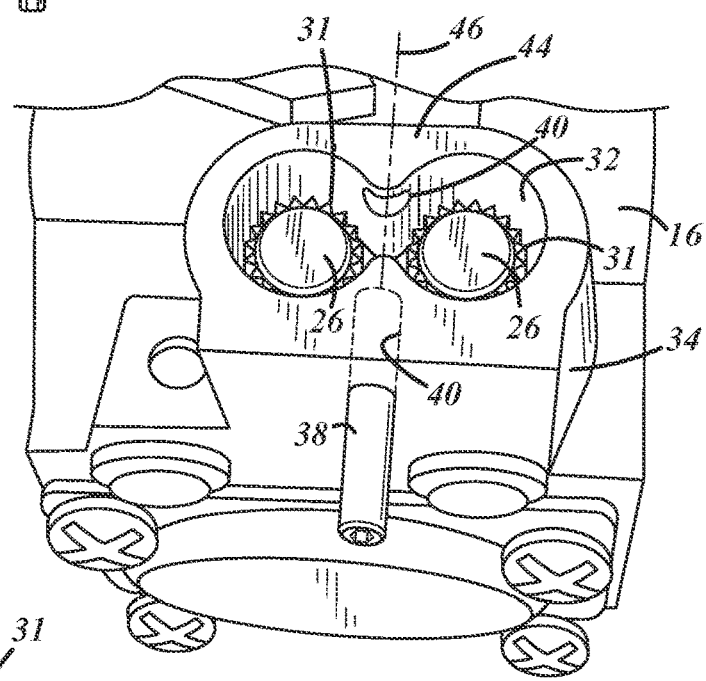
FIG. 4 is a perspective view of a portion of the carburetor as in FIG. 3.
Figure 7:
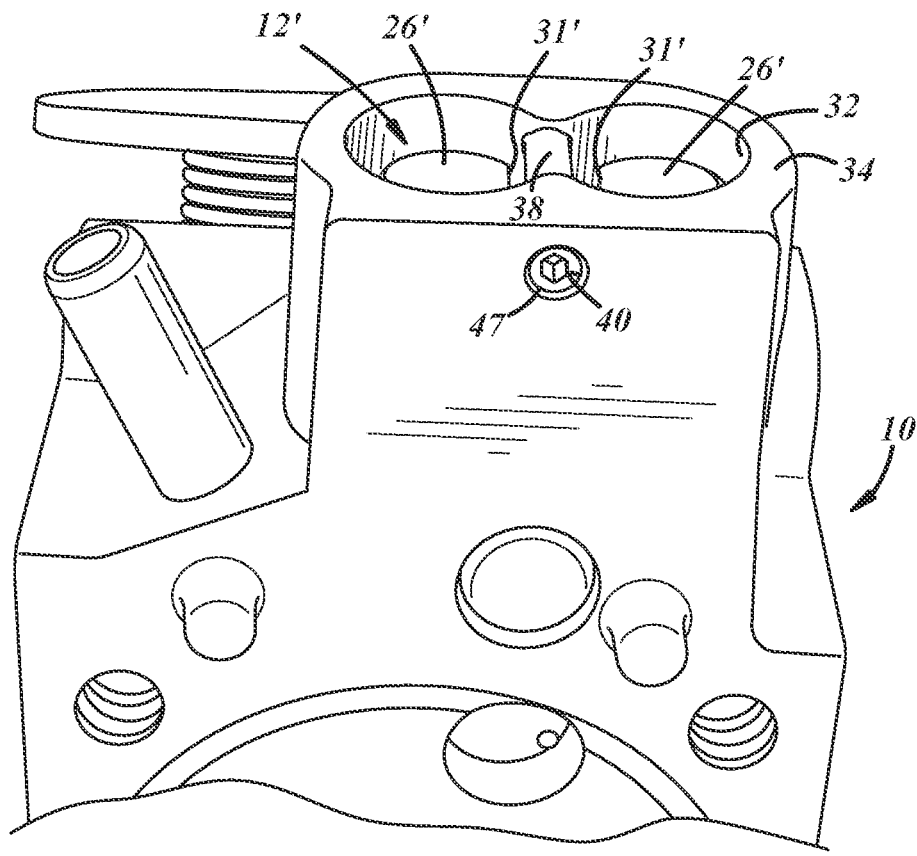
FIG. 7 is a perspective view showing the portion of the carburetor in FIG. 6.

As shown in FIGS. 3 and 4, during assembly of the carburetor 10 the pin 38 may be inserted into a first position wherein the pin is in only a first portion of the passage 40 formed in the first wall 42 but not completely received in the passage. In this position, the pin 38 does not significantly or at all extend into the cavity 32 so that the needle valve heads 26 may be accessed by a tool for rotation into a desired position. After the needle valves are adjusted as desired, the pin may be driven to its final position as shown in FIGS. 1, 2, and 5-7, fully received in the passage and extending into a second portion of the passage in second wall 44. As shown in FIG. 7, the end 47 of the pin 38 that is exposed in the outboard end of the passage 40 may be deformed to ensure a firm connection between the pin and the carburetor body 16 and inhibit removal of the pin from the passage by forcing the pin back out of the passage. Adhesive, welding, staking or other methods may be used to more permanently connect the pin to the carburetor body, if desired.

The initial installation of the pin into the first position in the carburetor body may be done by one entity, for example a manufacturer or assembler of the carburetor 10, and the final adjustment of the needle valves 12, 14 and movement of the pin to its second position may be done by a second entity, for example an engine manufacturer. This may permit the engine manufacturer or other second entity to adjust the needle valves 12, 14 while the carburetor is installed on the engine, or at some other time after the carburetor has been shipped by the first entity. Of course, one entity could perform all of these steps if desired. With the cover/pin received in its second position, a tool is not able to be received around the head 26 of either needle valve 12, 14 so the needle valves cannot be easily turned which inhibits someone from adjusting the needle valve position away from the calibrated position. In at least some implementations, the pin may be removed from the carburetor, or moved back to its first position, to permit service, repair or replacement of, for example, a needle valve or a seal associated therewith. To do this, a slide hammer or other suitable tool may be used to remove or move the pin but most end users will not have such a tool.

Figure 5:
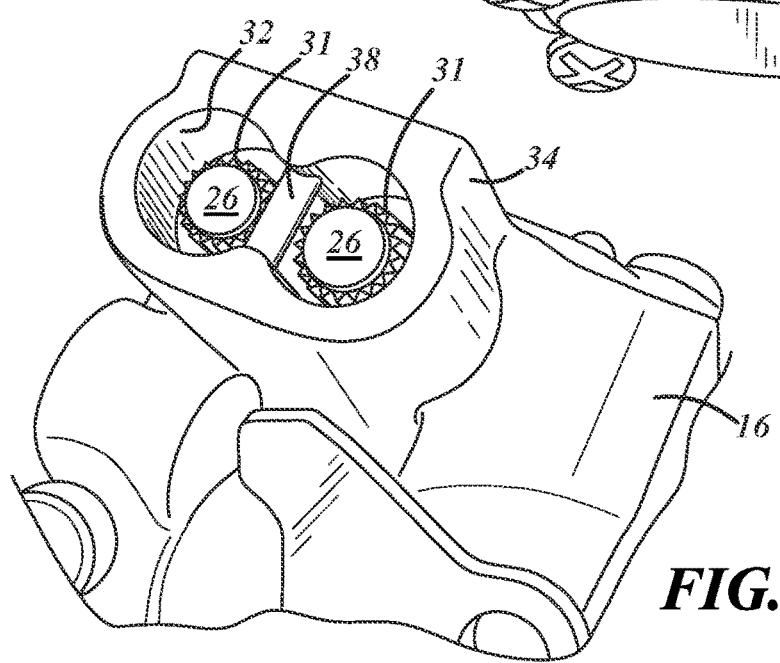
FIG. 5 is a perspective view of a portion of the carburetor showing the cover in a second, installed position.
Figure 6:
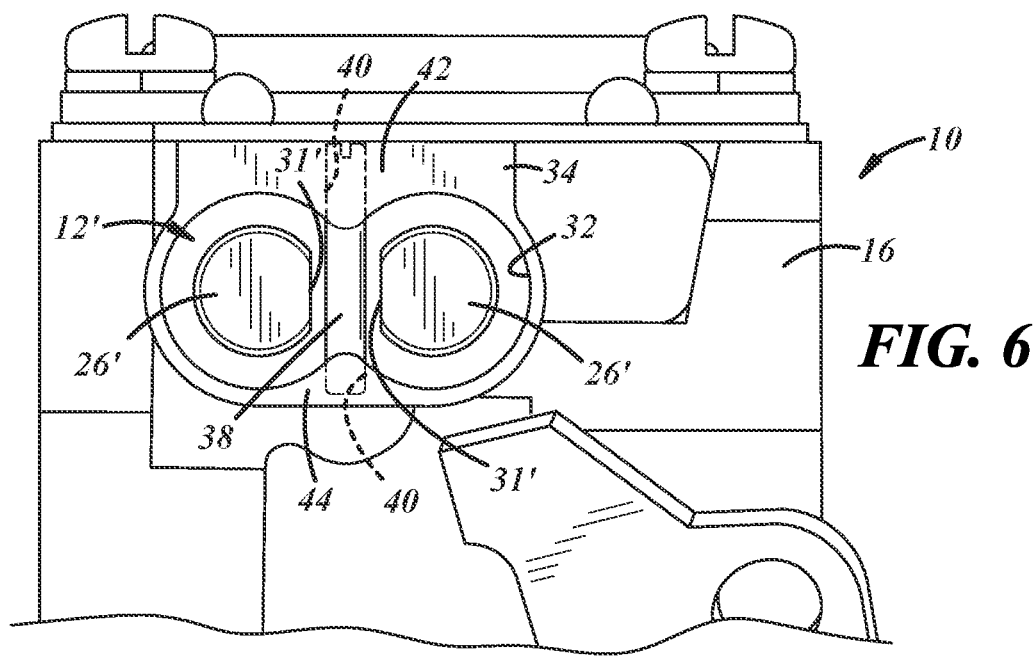
FIG. 6 is a side view of a portion of a carburetor showing a pair of adjustable valves and a cover in a second position.

As shown in FIGS. 1 and 3, one or more limiter caps 50 may also be used with the needle valve(s) 26 to limit the extent to which the needle valve(s) can be rotated after installation and calibration (the limiter caps are not shown in FIGS. 2, 4 and 5 so that the needle valves can be more clearly seen). The limiter cap 50 may have any construction and arrangement and typically have one or more stop features 52 (shown as a surface of the cap body 54) that engage an adjacent body (e.g. a different limiter cap, the carburetor body, etc) to prevent rotation of the needle valve(s) 26 beyond a threshold. In the example shown in FIGS. 1 and 3, the limiter cap 50 includes a cylindrical body 54 that surrounds at least part of the needle valve 26, and includes grooves formed in an inner surface that engage and mate with the serrations 31 or other non-circular feature on the needle valve(s) to inhibit or prevent relative rotation between the needle valve and the limiter cap when fully assembled. While shown with regard to the implementation shown in FIGS. 1-5, the limiter caps 50 can be used with other needle valves including, but not limited to, the needle valves 26' shown in FIGS. 6 and 7. The limiter caps 50 shown surround the serrated end of the needle valves 26 and further (i.e. in addition to the pin 38) consume volume within the cover or projection 34, restrict access to the serrations 31 and limit the ability of a tool to engage and rotate the needle valves 26, 26'. In known manner, the limiter caps 50 may be fully installed onto the needle valves 26, 26' after the needle valves are adjusted to a desired final and calibrated position. Thereafter, the limiter caps 50 permit only limited rotation of the needle valves 26, 26' from the calibrated position. Examples of limiter caps that may be used are shown and described in U.S. Pat. No. 7,097,165, the disclosure of which is incorporated herein by reference in its entirety.

Figure 10:
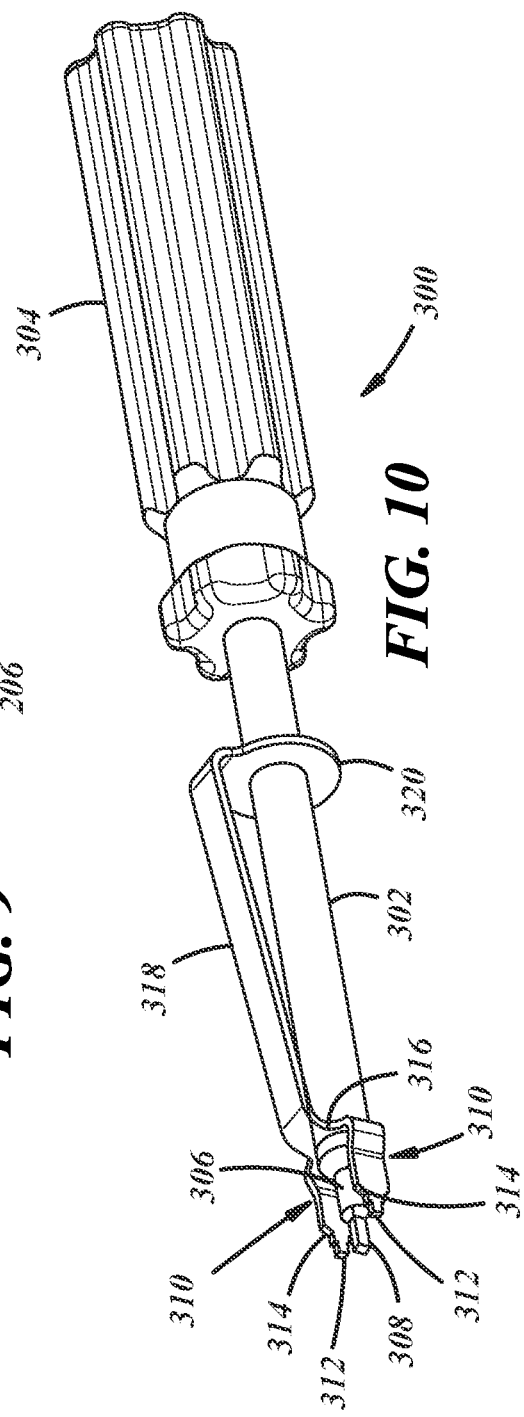
FIG. 10 is a perspective view of a special tool for release and movement of the lock plate.

The carburetor of FIGS. 8, 9, 11 and 12 illustrates another arrangement of a tamper resistant needle valve assembly having a cover that includes a cover plate and a locking plate. A tool that may be used with this assembly is also shown and described (see e.g. FIGS. 10-12).

Figure 8:
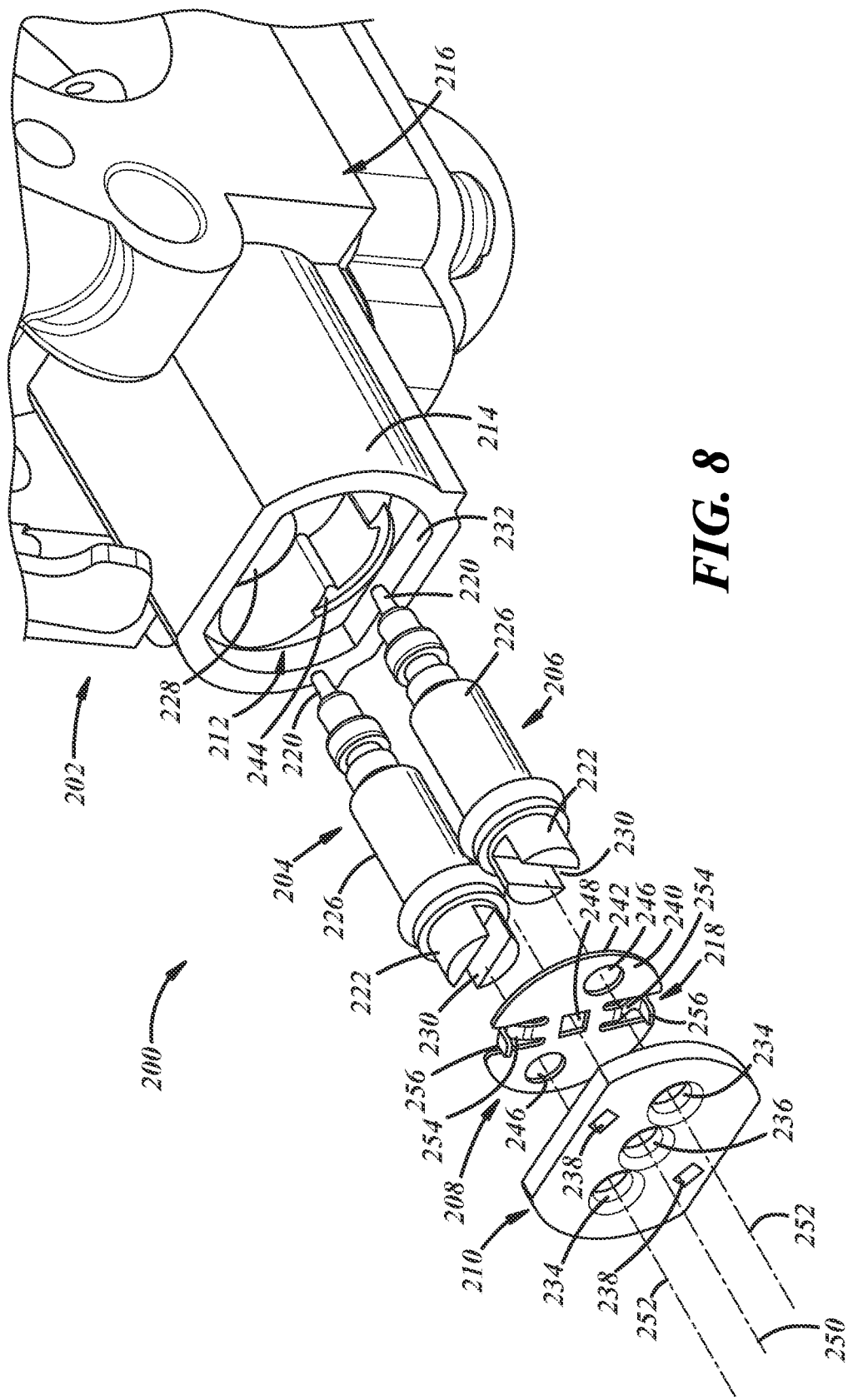
FIG. 8 is a perspective exploded view of a portion of a carburetor and a tamper resistant needle valve assembly.
Figure 9:
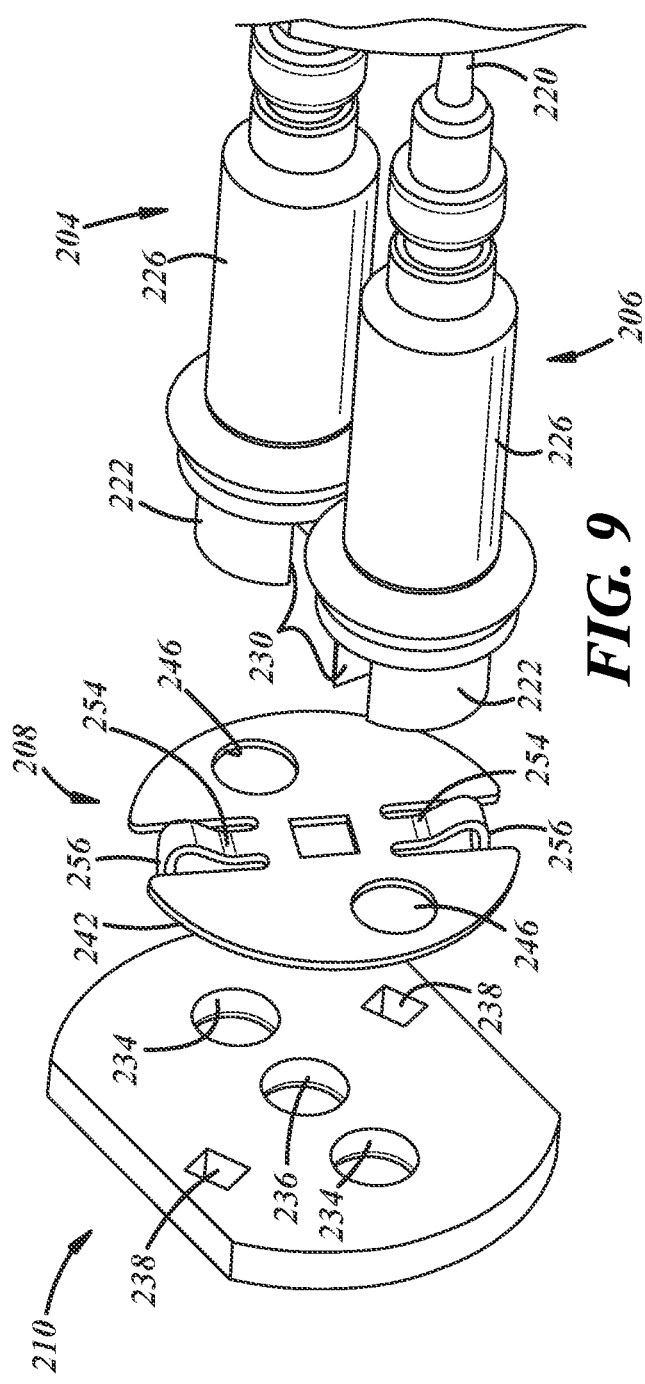
FIG. 9 is an enlarged perspective view of needle valves, a lock plate and a cover plate of the assembly of FIG. 8.

Referring in more detail to the drawings, FIG. 8 illustrates a tamper resistant needle valve assembly 200 for a carburetor 202 which is illustrated as a diaphragm type carburetor although this tamper resistant needle valve assembly may be used in other types of carburetors such as, without limitation, float bowl carburetors. The tamper resistant assembly 200 may have at least one, and often two, needle valves 204 and 206, a rotatable locking plate or disk 208 and a cover plate 210, all of which, in assembly, are received in a cavity or recess 212 in a boss 214 of a carburetor body 216. The disk 208 may be rotatable between an open position providing access to the needle valves 204, 206 for rotatably adjusting them and a closed position (FIG. 11) blocking access to the needle valves to at least inhibit and desirably prevent rotatably adjusting them. The disk 208 may be releasably locked or retained in its closed position by a detent or latch assembly 218 which cannot be opened or released by any common hand tools commercially available to an end user of an engine with a carburetor with this tamper resistant needle valve assembly.

As is known in the art, each needle valve 204, 206 may have a body in the form of a shank with an integral tip 220 adjacent one end, a head 222 adjacent the other end, and a threaded cylindrical portion 226 between them which, in assembly, is received in a complimentary separate threaded bore 228 for each needle valve. In assembly, the tip 220 of each valve cooperates with a seat (not shown) in the carburetor body so that rotation of the valve advances or retracts the tip relative to the seat to vary and control the quantity of fuel flowing between them and supplied to the mixing passage of the carburetor and hence changes and controls the fuel-to-air ratio of the fuel mixture supplied by the carburetor to an operating engine. To facilitate rotation of the valve to adjust the fuel mixture, the head 222 may have a slot 230 therein or other non-circular recess configured for engagement by a tool, for example a screwdriver, for manually rotating the valve. Alternatively, the periphery of the head 222 may have a non-circular configuration such as a D-shape or serrations or grooves for engagement by a complimentary socket of a tool for rotating the valve.

Figure 11:
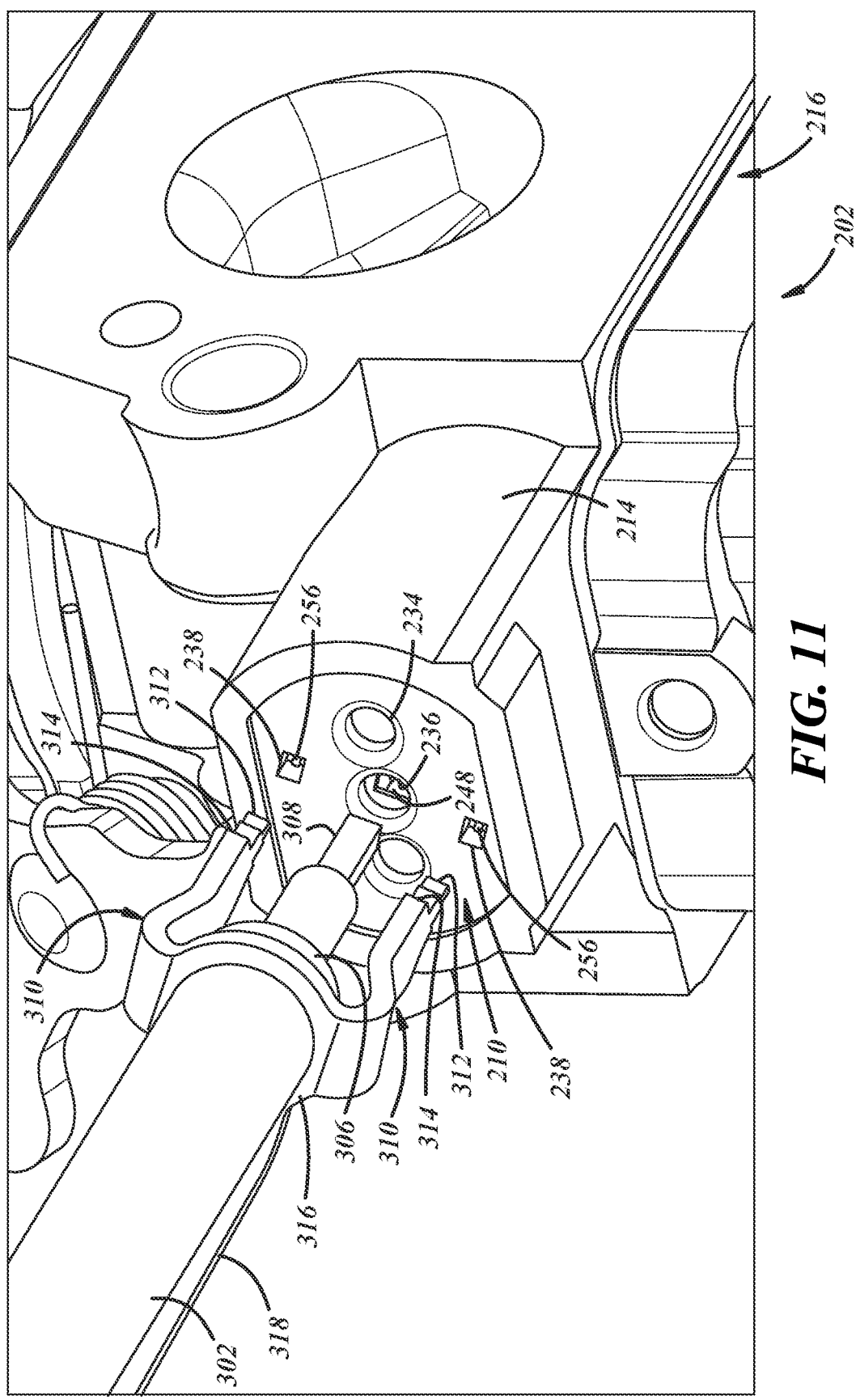
FIG. 11 is a perspective fragmentary view of the tool of FIG. 10 oriented for insertion into the needle valve assembly of FIG. 8.
Figure 12:
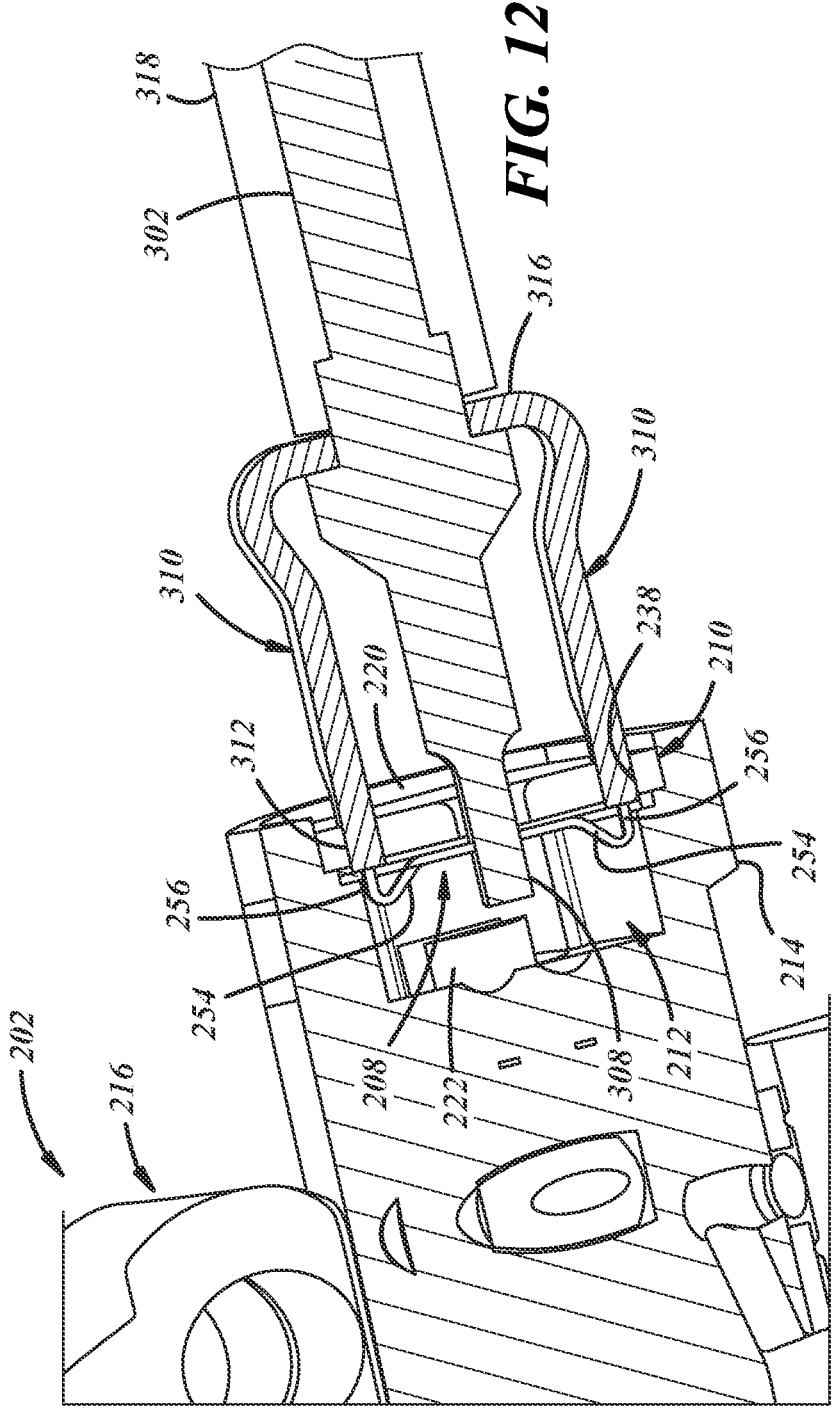
FIG. 12 is a fragmentary sectional view showing the release of the lock plate by the tool of FIG. 10 for rotation of the lock plate to provide access to the heads of the needle valves to permit adjustment of them.

As shown in FIGS. 11 and 12, in assembly, the cover plate 210 is received in the open end of the cavity 212 with its periphery received in a complimentary recess 232 in the cavity 212 adjacent the outer end of the boss 214. In assembly, the cover plate 210 is desirably permanently fixed in the recess 232 such as by an interference or press fit, staking portions of the boss over or into the cover plate, an adhesive or any other suitable means. The cover plate 210 has a through access hole 234 generally coaxial with the head of each needle valve to permit insertion of a tool, such as a screwdriver, through the access hole and when not blocked or covered by the locking disk 208 into engagement with the slot 230 in the head 222 of the valve for rotating it. The cover plate also has a tool central access hole 236 generally coaxial with the axis of rotation of the locking disk 208 for rotating it. For receiving a portion of a specialty tool to unlock or release the locking disk 208 for rotation, the cover plate 210 also has at least one, and desirably two, access through slots or holes 238 which may be generally rectangular in cross-section or of any other suitable shape. The cover plate may be made of steel and may be a hardened steel plate.

The locking disk 208 may have generally flat opposed faces 240 and generally cylindrical peripheral edge portions 242 which, in assembly, are received with a slight clearance in generally opposed complimentary cylindrical recess portions 244 in the cavity 212 in the boss 214 for rotation between closed and open positions. In the closed position, solid portions of the disk 208 at least partially overlap, and desirably completely overlap, the valve heads 222 and/or the access holes 234 through the cover plate to block or prevent access by a tool to the valve heads. In the open position holes 246 through the disk are large enough and desirably coaxially aligned with the access holes 234 in the cover plate to permit a tool to be inserted through these holes and into engagement with the head 222 of one of the needle valves for rotatably adjusting it. In assembly, the locking disk 208 may be rotated between its open and closed positions by a tool engageable with a receiver such as a complimentary non-circular hole, shown as a square hole 248 through the disk which is desirably coaxial with the axis of rotation 250 of the disk and the tool access hole 236 through the cover plate 210. Desirably the axis of rotation 250 of the disk, in assembly, is substantially parallel to the axis of rotation 252 of each of the needle valves and is desirably equally spaced between these axes and lies in a plane containing these axes of the needle valves. In other words, desirably the axes 252 of the needle valves and the axis of rotation 250 of the disk all lie in the same plane, are parallel to each other and the axis of rotation of the disk is equally spaced apart between the axes of the needle valves. In assembly, the cover plate 210 retains with a slight clearance the locking disk 208 in the cylindrical recessed portions 244.

In assembly, the disk 208 may be releasably locked or retained, in its closed position by the latch assembly 218 which may have at least one spring finger 254, and desirably, at least two spring fingers 254, circumferentially spaced apart and desirably integrally formed with the disk. Each spring finger may have a generally hook shape with a peripheral tip or tab 256 received in one of the holes 238 in the cover plate when aligned therewith. The fingers 254 may be made of a flexible and resilient material such as spring steel and configured so that each tab is biased to snap into its associated hole 238 when aligned therewith.

To unlatch or release the disk 208 so that it may be rotated to its open position, a specialty tool 300 (FIG. 10) may be used to manually push inward the tabs 256 (as shown in FIG. 12) to disengage them from the slots or holes 238 so that the disk may be rotated to its open position. Desirably the tabs 256 and the holes 238 are configured and sized so that the tabs cannot be disengaged from the holes by using any commercially available common tool such as a screwdriver, awl, punch, pins or the like. The specialty tool 300 may have an elongate and desirably cylindrical shank 302 with a manually engageable handle 304 fixed adjacent one end and a tip 306 at the other end with a driver such as a tang 308 having a cross-sectional configuration complimentary to and insertable into and slidably engageable with, the receiver non-circular hole 248 through the disk for rotating the disk between and to its open and closed positions when the tabs 256 of the fingers 254 are disengaged from the holes 238 through the cover plate. To disengage the tabs of the fingers from the cover plate holes 238, the tool 300 may have spaced apart and generally axially projecting arms 310 each with a tip 312 generally axially insertable into one of the holes 238 and of sufficient axial length to bear on the free end of the tab 256 therein and move sufficiently into the hole to move the tab inwardly sufficiently to disengage it from the hole 238 as shown in FIG. 12. Each arm may also have shoulders 314 limiting the extent to which the tip 312 may be inserted into the cover plate 210 so that the tip does not overlap the body of the disk 208 and thereby inhibit rotation of the disk by manual rotation of the handle and shank of the tool 300 when its tang 308 is inserted into the disk drive hole 248. Desirably, the arms 310 are generally diametrically opposed on opposite sides of the shank 302 and are carried by a central portion 316 with a through hole through which the shank 302 is rotatably received. To facilitate rotating and axially moving the arms 310 for alignment with and insertion into the slots, desirably they may be attached to one end of an elongate bar 318 with a collar or washer 320 adjacent its other end and rotatably received on the shank 302.

With this tamper resistant fuel mixture needle valve assembly 200 installed on a carburetor, it helps to ensure that the needle valves will not be adjusted or changed by an end user from a factory setting which may be required to comply with environmental standards and restrictions as may be governmentally mandated and/or to avoid adverse or deleterious engine operation with other than the factory intended fuel-to-air ratio mixture produced by the carburetor on a running engine. At the factory the disk 208 is initially positioned or moved to its open position and with each engine running, the needle valves 204 are adjusted so that its carburetor provides the desired fuel-to-air ratio mixture supplied to the operating engine to comply with environmental standards or requirements and/or to avoid adverse or undesirable engine operation. After such adjustment, the disk 208 may be rotated to its closed and locked position in which the tips 256 of the fingers 254 engage the holes 238 in the cover plate 210 by a tool insertable through the tool hole 236 in the cover plate and into engagement with the non-circular driving hole 248 through the disk. With the disk locked in its closed position, an end user of the engine is inhibited from adjusting the needle valves with any conventional tools.

To facilitate an authorized dealer or factory representative in subsequently making any adjustments of the needle valves 204, a specialized tool, for example, the tool 300 may be used to unlock the disk 208 and rotate it to its open position. To do so the tang 308 of the tool may be manually inserted through the cover tool hole 236 and into the disk driving hole 248 and the bar 318 manually manipulated to rotate the arms 310 of the tool into generally axial alignment with the holes 238 in the cover plate and then manipulating the bar to axially advance the tips 312 of the arms into the holes 238 to bear on and push the tabs 256 of the fingers 254 of the disk out of these holes as shown in FIG. 12. The handle 304 and shank 302 of the tool 300 may then be rotated to move the disk 208 to its open position. Desirably the tool 300 is then removed, and a screwdriver or other appropriate tool inserted through one of the holes 234 in the cover plate and the corresponding hole 246 in the disk 208 and into engagement with the slot 230 of the head of the associated needle valve 204 or 206 and manipulated to manually rotate this valve to obtain the desired air-to-fuel ratio for the operating engine on which the carburetor is used. After this field adjustment by an authorized dealer or factory representative, the specialty adjustment tool 300 or any other suitable tool may be used to engage the non-circular driving hole 248 in the disk 208 and rotate the disk to its locked position in which the tips 256 of the resilient fingers 254 snap into the holes 238 in the cover plate and lock the disk in its closed position in which it at least partially covers or overlaps the holes 234 in the cover plate and/or the head 222 of the needle valves.

FIGS. 13-16, 25 and 26 illustrate another form of a tamper resistant needle valve assembly 400 for a carburetor 202. Some of the components of the assembly 400 are the same as those of the tamper resistant valve assembly 200 and are identified with the same reference numbers and the description thereof and will not be repeated herein. Other components are very similar and are identified by the same reference numbers with a prime symbol.

Figure 13:
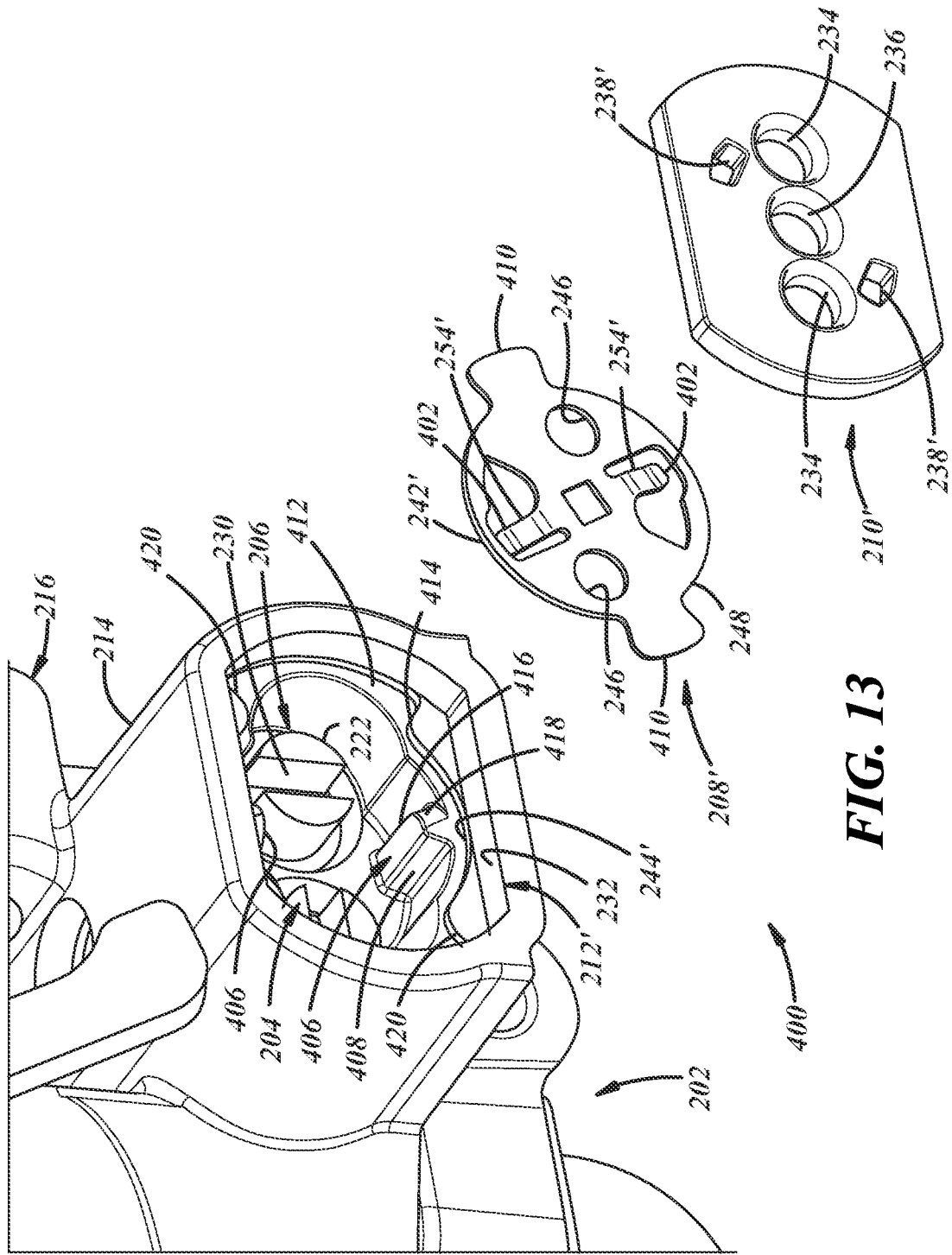
FIG. 13 is a perspective exploded view of a portion of a carburetor with another form of a tamper resistant needle valve assembly.
Figure 25:
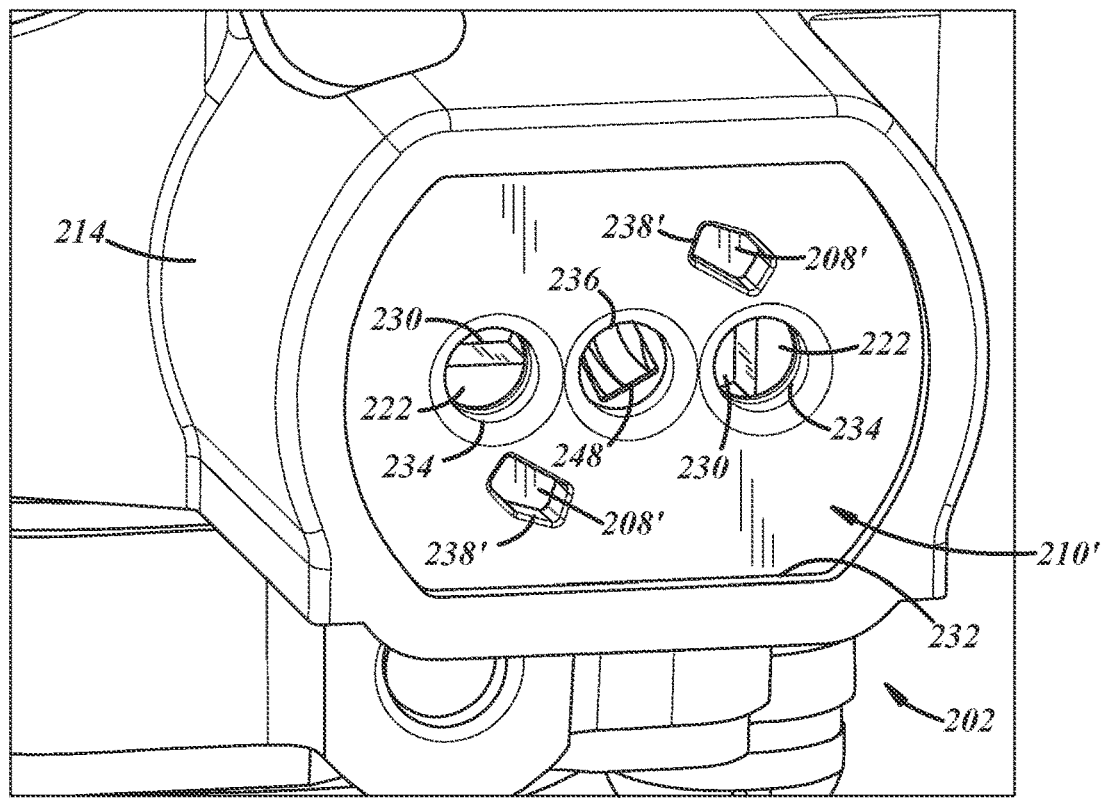
FIG. 25 is a perspective fragmentary end view of the assembly of FIG. 13 with its lock plate in its fully open position providing access to the heads of the needle valves of the assembly of FIG. 13.
Figure 26:
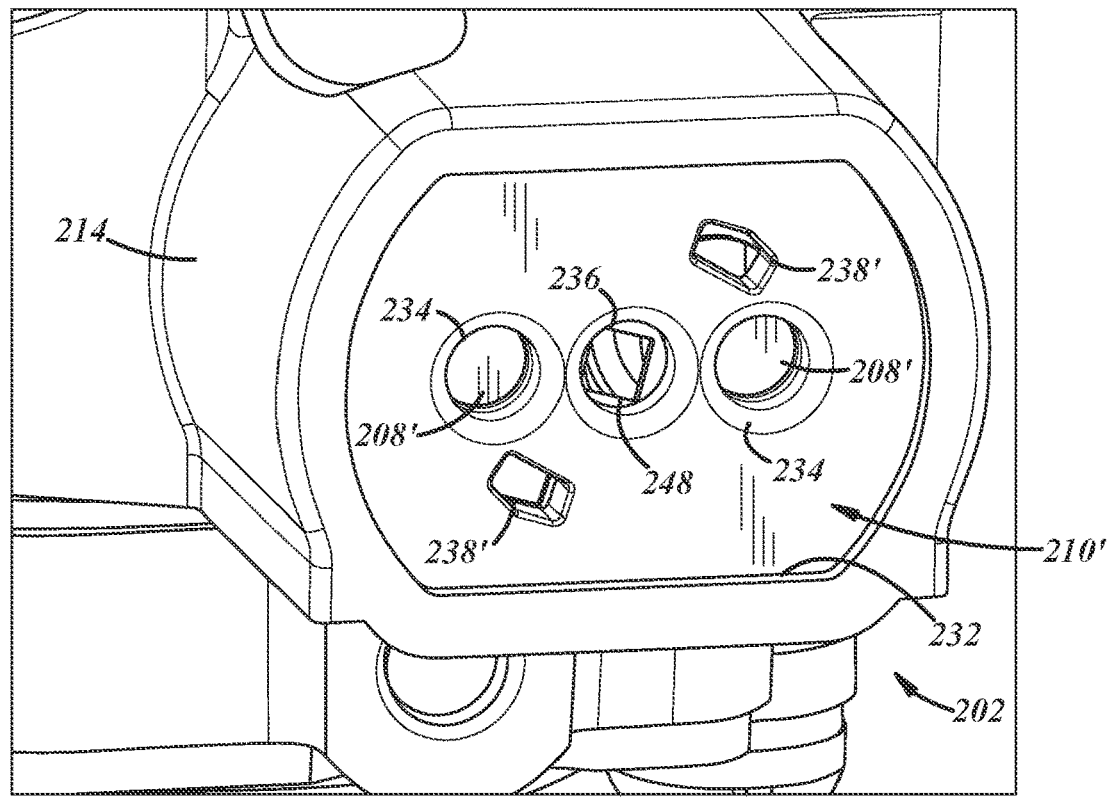
FIG. 26 is a perspective fragmentary end view of the assembly of FIG. 13 with its lock plate in its closed and latched position blocking access to the heads of the needle valves of the assembly of FIG. 13.

The tamper resistant assembly 400 may have at least one, and often two, needle valves 204 and 206, a rotatable lock plate or disk 208' and a cover plate 210', all of which, in assembly, are received in a cavity or recess 212' in a boss 214 of a carburetor body 216. The disk 208' may be rotatable between an open position providing access to the needle valves 204, 206 for rotatably adjusting them and a closed position blocking access to the needle valves to at least inhibit and desirably prevent rotatably adjusting them. The disk 208' may be releasably locked and retained in a closed position by a detent or latch assembly which cannot be opened or released by any common hand tools commercially available to an end user of an engine with a carburetor with the tamper resistant needle valve assembly 400. As shown in FIGS. 13, 25 and 26, the cover plate 210' is received in the open end of the cavity 212' with its periphery received in a complimentary recess 232 in the cavity adjacent the outer end of the boss 214. In assembly, the cover plate 210' is desirably permanently fixed in the recess 232 such as by an interference or press fit, staking portions of the boss over or into the cover plate, an adhesive or any other suitable means. The cover plate 210' has a through access hole 234 generally coaxial with the head 222 of each needle valve to permit insertion of a tool through the access hole when not blocked by the locking disk 208' and into engagement with the slot 230 in the head 222 of the valve for rotating it. The cover plate also has a tool access center hole 236 generally coaxial with the axis of rotation of the locking disk 208' for rotating it. For receiving a portion of a specialty tool to unlock or release the locking disk 208' for rotation, the cover plate also has at least one, and desirably two, access through slots or holes 238' which may be generally rectilinear in cross-section or of any other suitable shape providing clearance for insertion and limited circumferential movement of the fingers of the specialty tool for releasing the latch assembly. The cover plate 210' may be made of steel and may be a hardened steel plate.

The locking disk 208' may have generally cylindrical edge portions 242' which, in assembly, are received with a slight clearance in generally opposed complimentary cylindrical recess portions 244' in the cavity 212' for rotation between closed and open positions. In the closed position, solid portions of the disk 208' at least partially overlap and desirably completely overlap the valve heads 222 and/or the access holes 234 through the cover plate 210' to block and prevent access by a tool to the valves. In the open position, holes 246 through the disk are large enough and desirably coaxially aligned with the access holes 234 in the cover plate to permit a tool to be inserted through these holes and into engagement with the head 222 of the needle valves for rotatably adjusting each valve. In assembly, the locking disk 208' may be rotated between its open and closed positions by a tool engageable with a complimentary non-circular drive hole, shown as a square hole 248 through the disk which is desirably coaxial with the axis of rotation 250 of the disk and the tool access hole 236 through the cover plate 210'.

Figure 15:
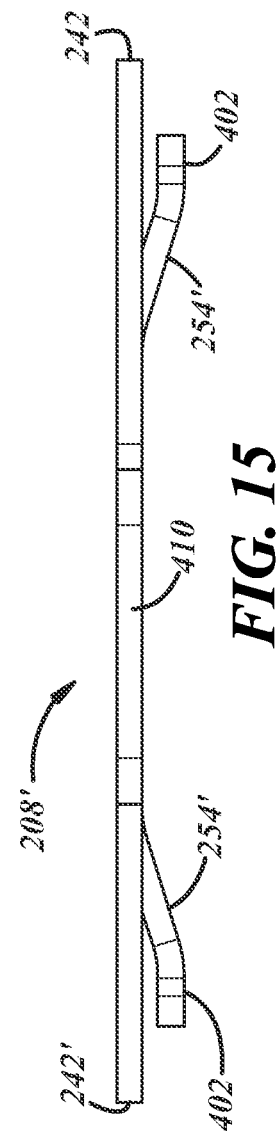
FIG. 15 is an end or edge view of the lock plate disk of the assembly of FIG. 13.
Figure 16:
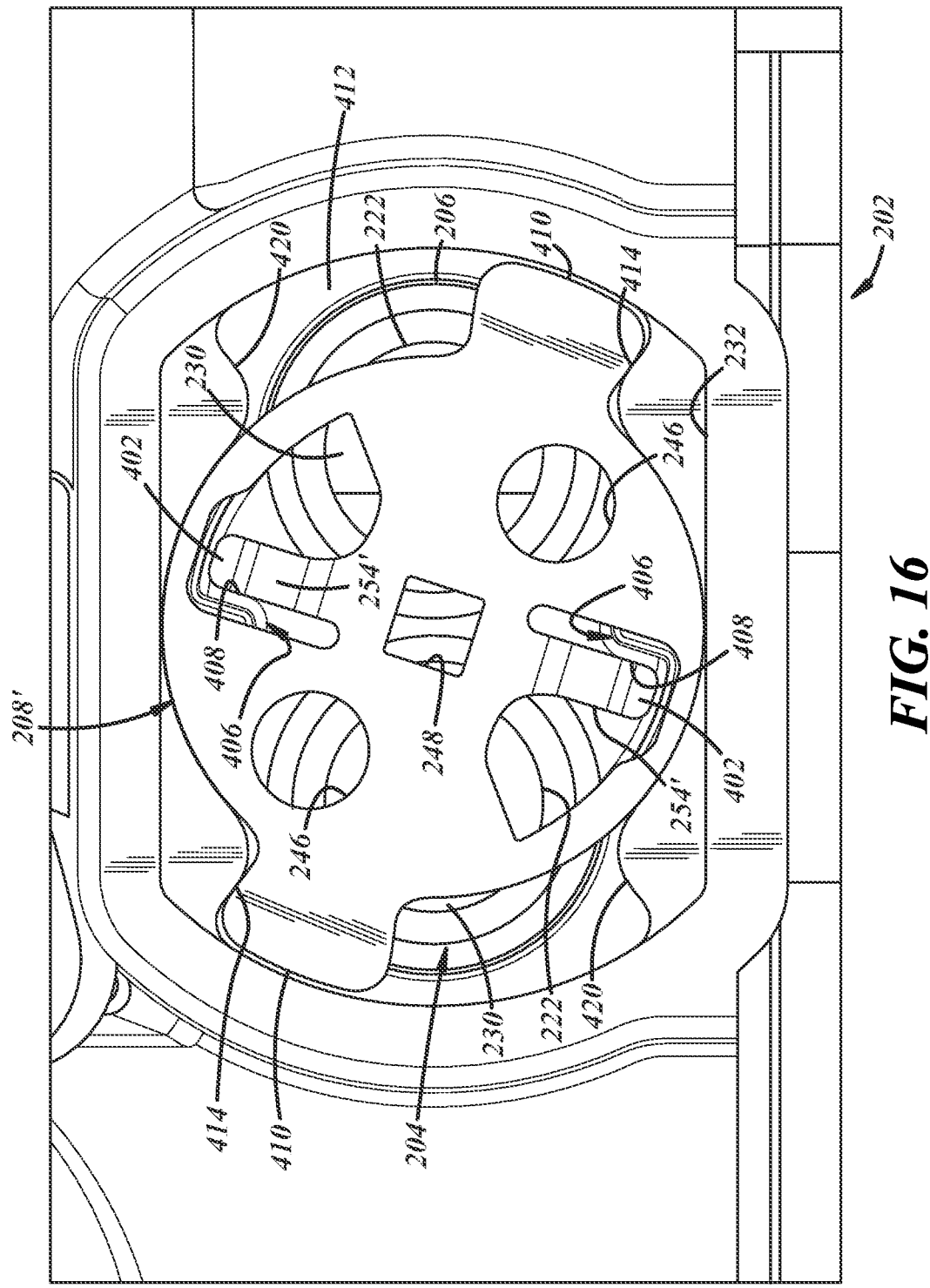
FIG. 16 is an end view of the cavity with the lock plate shown in its closed position in the assembly of FIG. 13.

In assembly, the disk 208', may be releasably locked or retained in its closed position by the latch assembly which may have at least one spring finger 254' and desirably at least two spring fingers 254' circumferentially spaced apart and desirably integrally formed with the disk. As shown in FIG. 15 each spring finger 254' has adjacent its free end a generally radially extending tab 402 disposed axially inwardly of the inner face of the disk 208' and terminating radially inwardly of the adjacent circumferential edge portion of the disk. The fingers 254' may be made of a flexible and resilient material such as spring steel and be configured so that each tab 402 may be yieldably moved axially outwardly such as by an associated cam surface 418 of a projection 406 in the cavity and snap into overlapping engagement with an associated cavity stop surface 408 of each projection when the disk is rotated into its fully closed position as best shown in FIG. 16. The disk 208' may also have at least one tongue 410 and desirably a pair of tongues 410, each extending generally radially outwardly of the circumferential edge portions 242' and, in assembly, received in recesses 412 in the cavity and engageable with stop edge portions 414 of the recesses 412 to limit further clockwise rotation (as viewed in FIG. 16) of the disk to ensure that solid portions of the disk at least partially overlie and block access to the heads of the needle valves when the disk is in its closed position.

Figure 14:
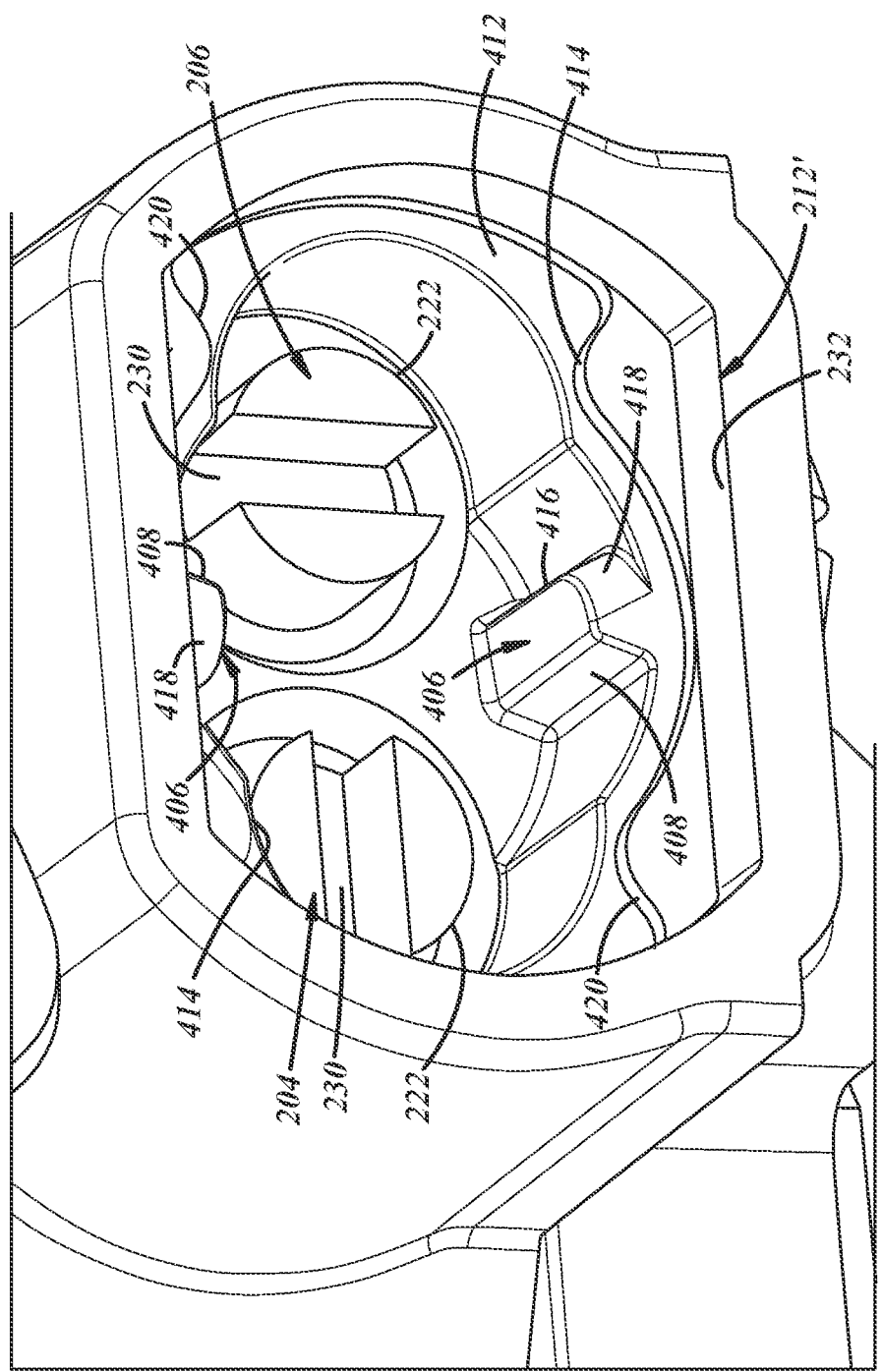
FIG. 14 is an enlarged fragmentary perspective view of the needle valve cavity with needle valves therein of the assembly of FIG. 13.

As best shown in FIG. 14 the projections 406 in the cavity may be generally diametrically opposed, extend generally axially and radially inward of the periphery of the disk when received in assembly in the cavity 212'. Each projection 406 has the stop surface 408 on one side, a stop surface 416 on the other side, and adjacent the other side and free end a generally arcuate cam surface 418 for moving the tabs 402 of the fingers of the disk generally axially outwardly so that they may ride over the free end of the associated projection 406 and snap into overlapping engagement with the stop surface 408 when the disk is rotated from its fully open position shown in FIG. 17 to its closed position shown in FIG. 16.

Figure 17:
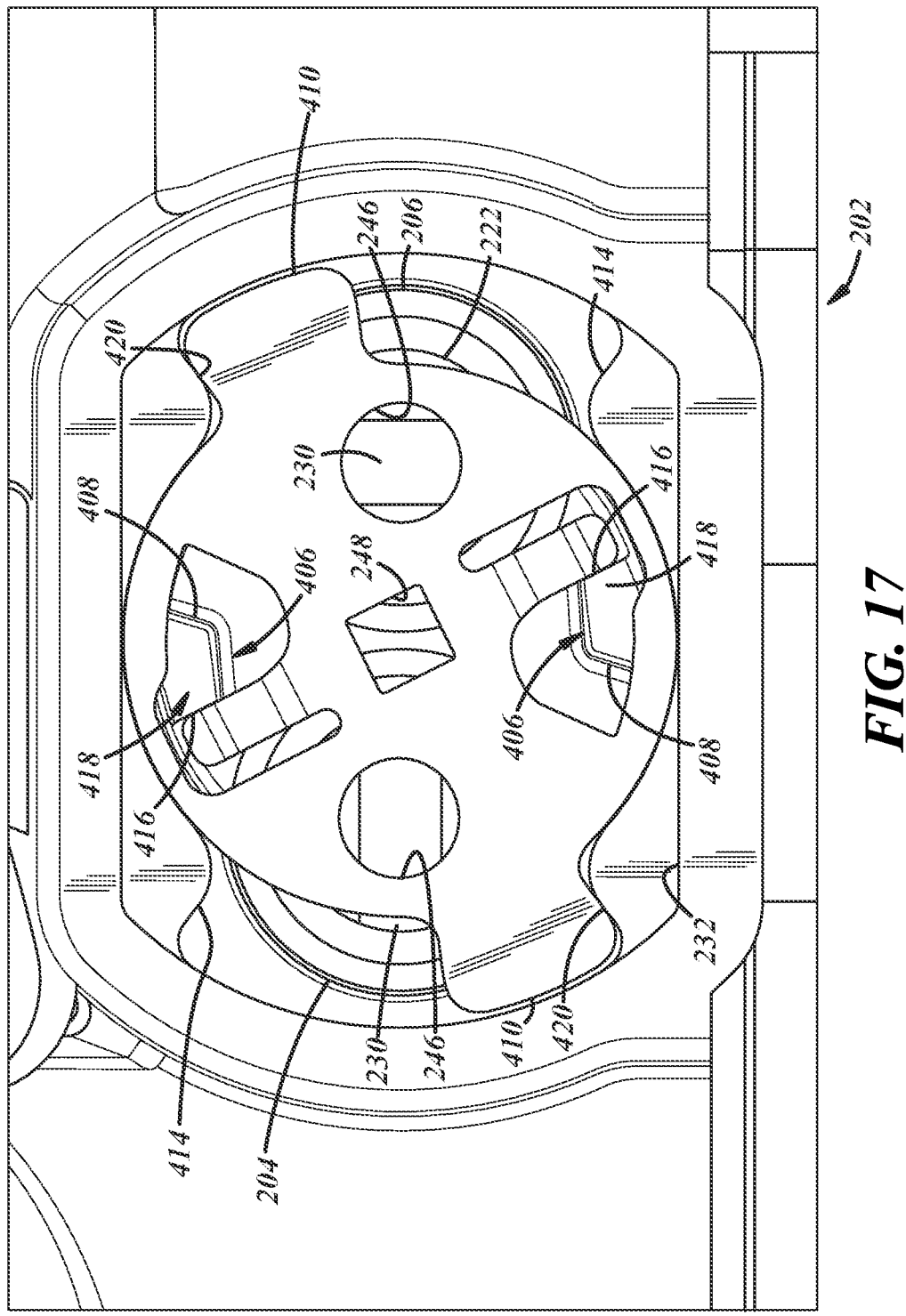
FIG. 17 is an end view of the cavity with the lock plate shown in its fully open position in the assembly of FIG. 13.

As shown in FIG. 16, rotation of the disk clockwise beyond its fully closed position may be limited by at least one tongue 410, and preferably by a pair of generally diametrically opposed tongues 410, bearing on stops 414 provided by edge portions of the recesses 412 in which the tongues are received in assembly. When the disk is rotated counterclockwise as shown in FIG. 17 to its fully open position, these tongues may also bear on stops 420 provided by edge portions of these recesses to limit counterclockwise rotation beyond the fully open position of the disk. In the fully open position the fingers 254' of the disk may engage or have a slight clearance with the generally axially extending inclined stop surfaces 416 of the projections 406 in the cavity.

Figure 18:
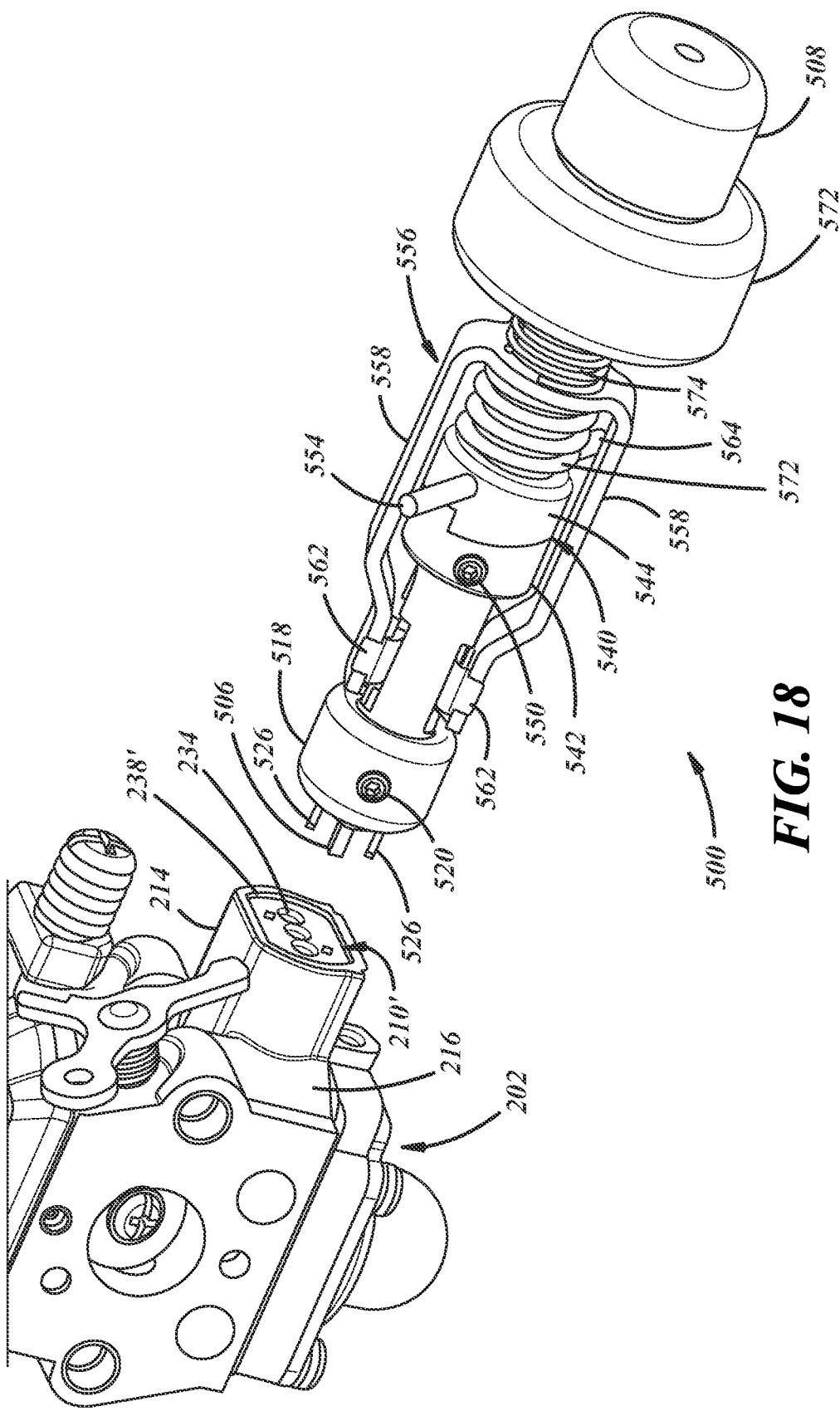
FIG. 18 is a perspective view of another special tool for release of the lock plate from its latched position of the tamper resistant needle valve assembly of FIG. 13.
Figure 19:
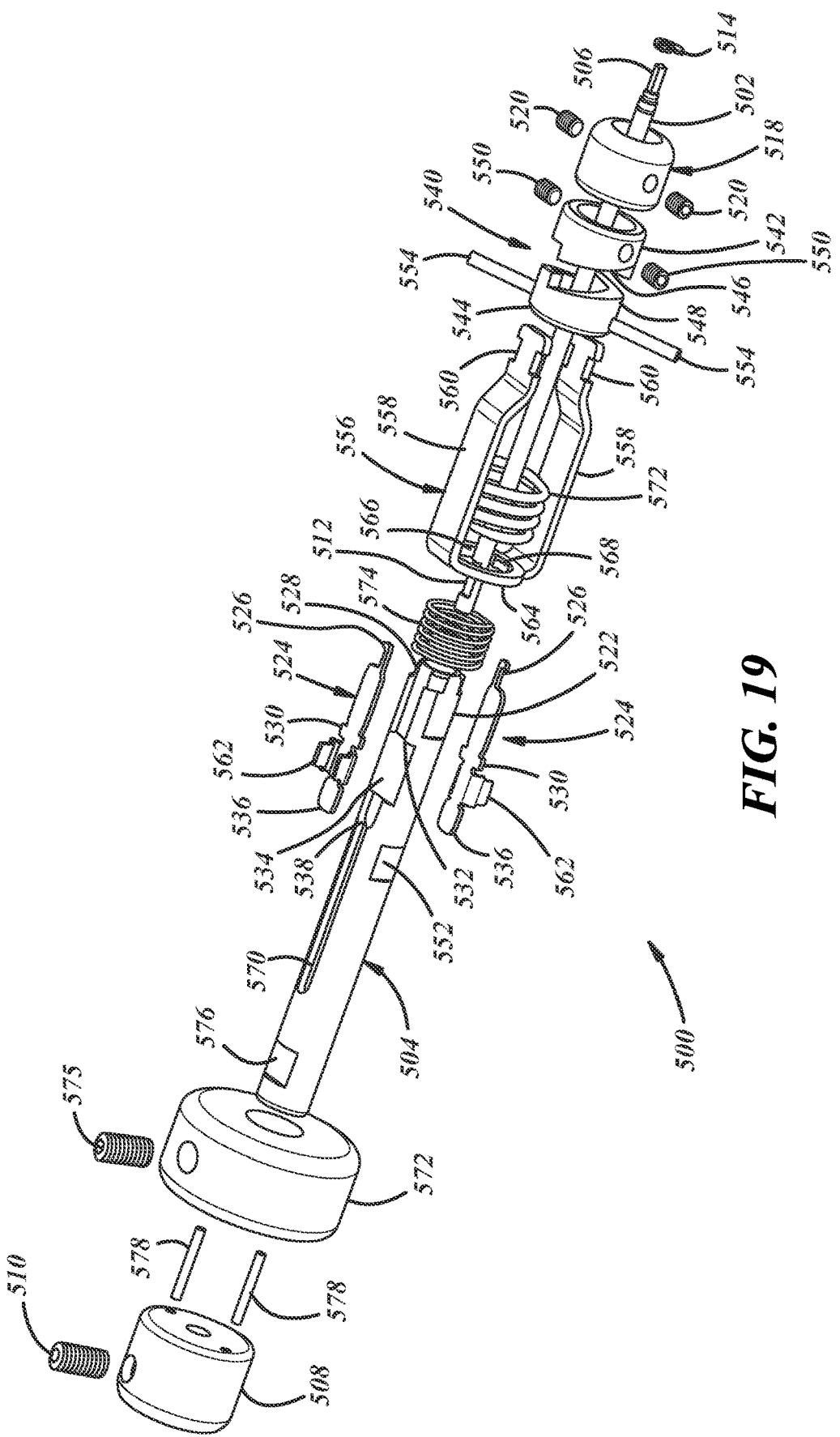
FIG. 19 is an exploded perspective view of the tool of FIG. 18.

To unlatch or release the disk 208' so that it may be rotated towards its open position, a specialty tool 500 shown in FIGS. 18-21 may be used to manually pull the tabs 402 of the fingers 254' outward toward or beyond the outer ends of the projections 406 in the cavity so that the disk 208' may be rotated toward its open position. As shown in FIGS. 19 and 21 this tool has a rod 502 rotatably received in a barrel or sleeve 504 and with a tang with a non-circular cross-section shown here as a square tang 506 slidably receivable in the square central hole 248 of the disk 208' for rotating it toward its open position. To facilitate rotating the rod 502, a knob 508 may be attached to it adjacent its other end such as by a set screw 510 bearing on a flat 512 in the rod. The rod may be retained in the barrel by a snap ring 514 received in a groove in the shaft and disposed in a recess 516 in one end of the barrel and the knob 508 disposed closely adjacent to or bearing on the other end of the barrel. A nose collar 518 may be attached to the barrel 504 by set screws 520 threaded in the nose collar and bearing on opposed flats 522 in the barrel.

A pair of slides 524 each with a hook 526 adjacent one end for engagement with the fingers 254' of the disk 208' are generally axially movably received in circumferentially spaced apart and generally opposed longitudinal recesses 528 in the barrel. The extent to which each slide 524 can be axially extended relative to the barrel is limited by tabs 530 of the slide bearing on an edge 532 of a transverse slot 534 in which they are received. The extent to which the slides may be retracted relative to the barrel may be limited by an end 536 of each slide bearing on an inwardly extending portion 538 of the recess. The slides and thus the hooks may be advanced and retracted in unison by a cam mechanism 540 with a collar 542 and a rotatable ring 544 received on the barrel and having complimentary cam and follower surfaces 546 and 548. The collar 542 is fixed on the barrel such as by set screws 550 threaded into the collar and, in assembly, bearing on opposed flats 552 in the barrel. To facilitate rotating the cam ring 544 relative to the collar 542 and the barrel, it may have a pair of generally opposed handles 554 threaded into or otherwise attached to the cam ring. The slides 524 and their hooks 526 are operably connected with the cam ring 544 for generally axial movement to their extended and retracted positions by a generally U-shaped member 556 having a pair of longitudinally extending arms 558 with recesses 560 adjacent their free ends in which complimentary tabs 562 of the slides are received for axial engagement with an associated arm. The arms are connected together by a central bite portion 564 having a bore 566 with inwardly protecting tabs 568 slidably received in complimentary axially extending grooves 570 in the barrel. Longitudinal movement of the cam ring 544 is transmitted to the U-shaped arm member 556 through a spring 572 slidably received on the barrel and disposed between them. The U-shaped arm member 556 and thus the slides 524 and hooks are yieldably biased toward their extended positions by a spring 574 slidably received on the barrel and bearing on the bite portion 564 of the arms member 556 and a handle collar 572 fixed to an adjacent end of the barrel such as by a set screw 575 threaded into the collar and bearing on a flat 576 on the barrel. These springs also accommodate variations or tolerances in the generally axial length and location of the various components carried by the barrel and of the length of the barrel and in the positions of the various components thereon. The extent of rotation of the knob 508 relative to the barrel and thus, the tang 506 relative to the slide hooks 526, may be limited by at least one, and desirably a pair of pins 578 axially received in blind holes in this knob and slidably received in circumferentially extending annular groove segments in the collar handle 572 and coaxial with the axis of rotation of the rod 502.

Figure 22:
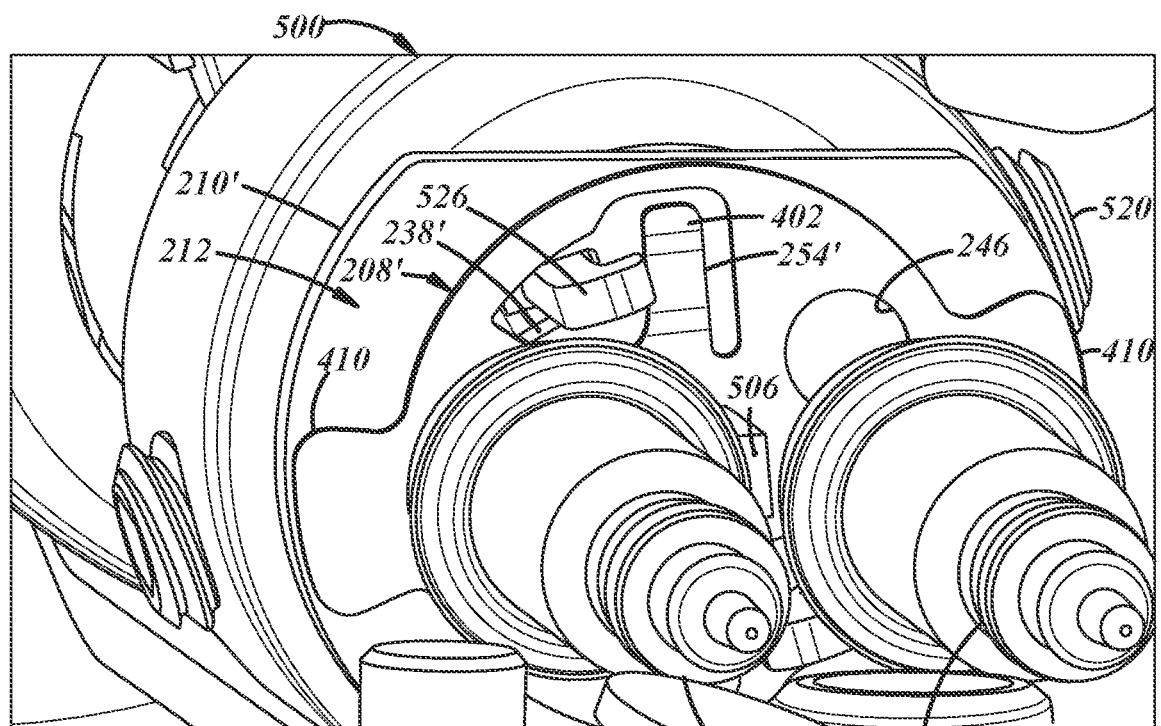
FIG. 22 is a fragmentary perspective view of the hook of one of the fingers of the tool of FIG. 18 inserted into the tamper resistant needle valve assembly of FIG. 13.
Figure 23:
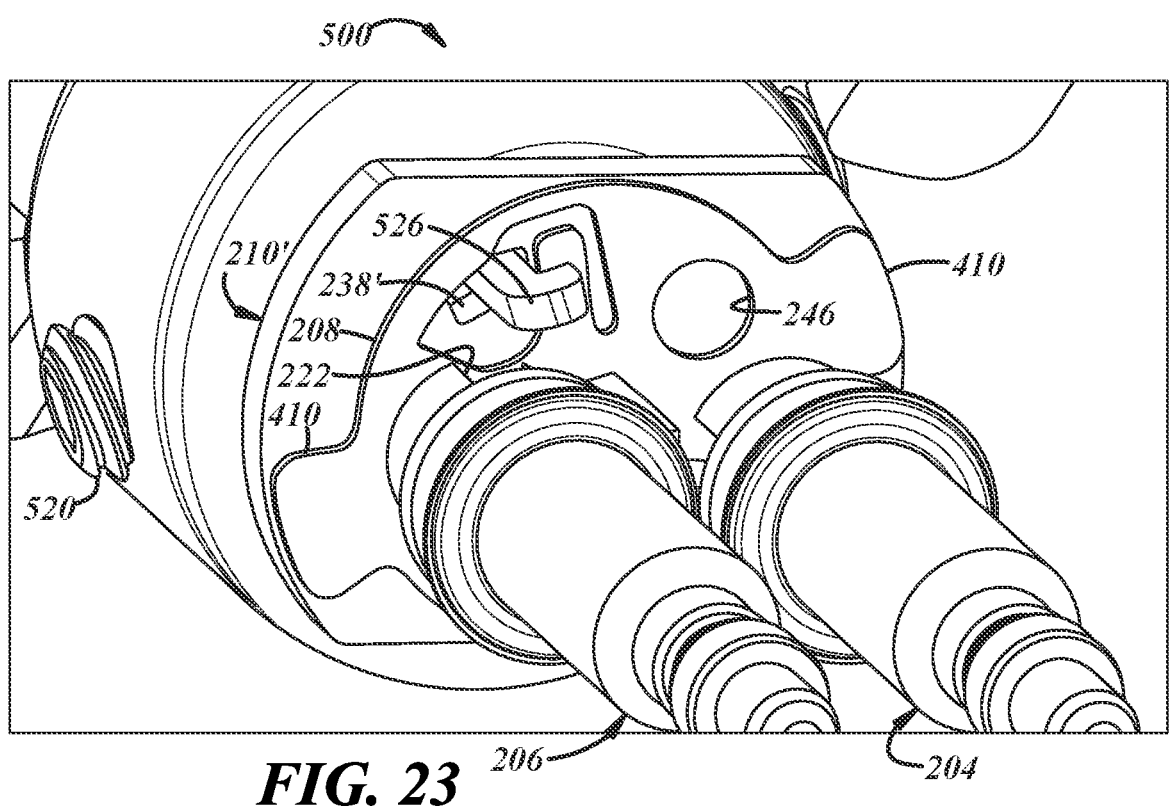
FIG. 23 is a fragmentary perspective view of the hook of FIG. 22 shown in overlapping engagement with the finger of the lock plate of the assembly of FIG. 13.
Figure 24:
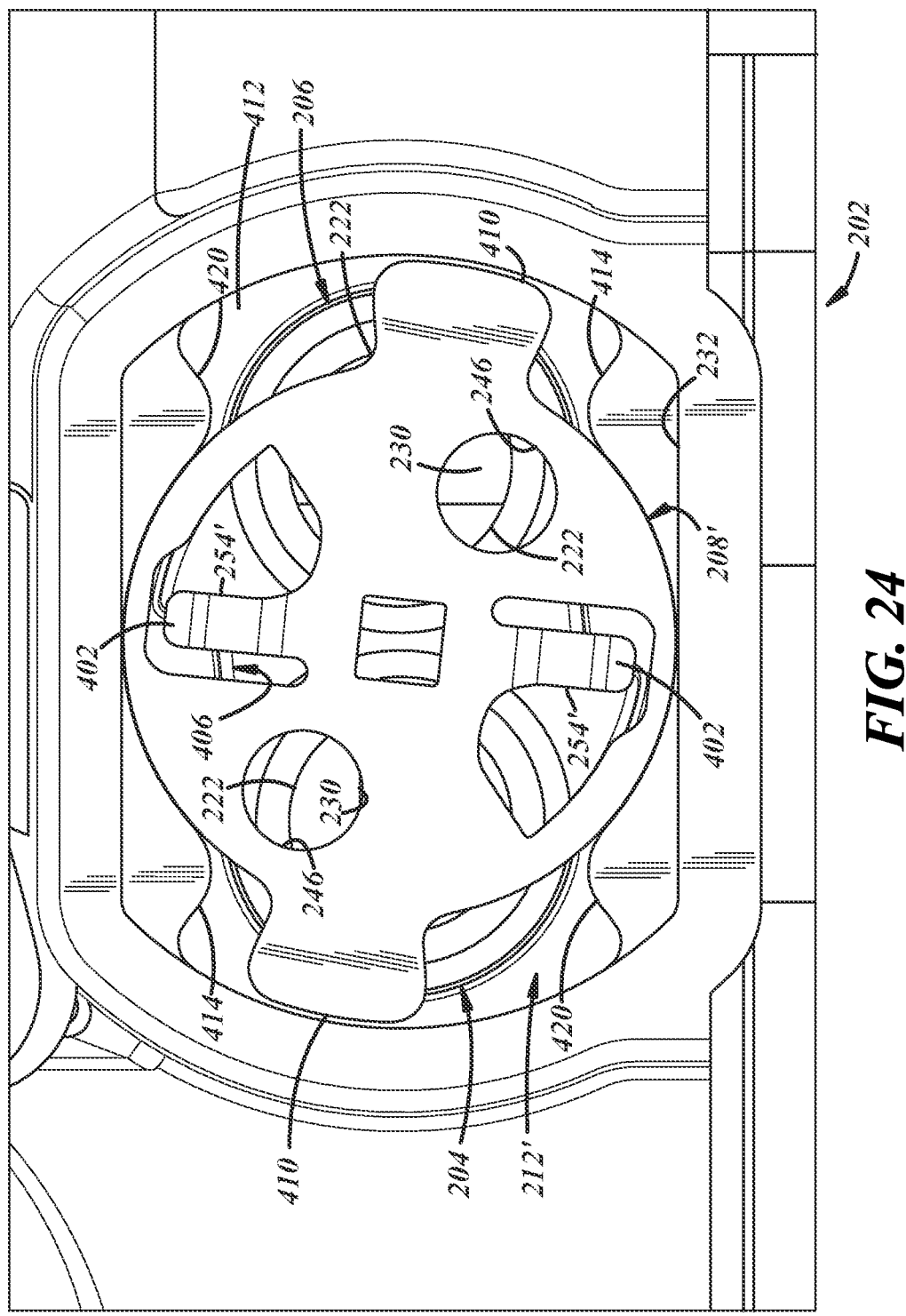
FIG. 24 is an end view of the cavity of the assembly of FIG. 13 with the lock plate shown in a partially open position where its fingers are disengaged from their associated stops of the assembly of FIG. 13.

This specialty tool 500 may be used to release the latch assembly 218' so that the lock plate 208' may be rotated toward its open position. To do so, as shown in FIG. 18, the tang 506 and hooks 526 of this tool are aligned with, and inserted into, the respective holes 236 and 238' in the cover plate 210' so that an adjacent end face of the nose collar 518 and/or the barrel 504 desirably bears on the cover plate 210'. This positions the hooks 526 of this tool so that they are axially inboard of an inner face of the fingers 254' of the lock plate 208' as shown in FIG. 22. Then the knob 508 is rotated counterclockwise (as viewed in FIG. 18) to dispose the hooks 526 in overlapping relationship with the fingers 254' of the locking plate as shown in FIG. 23. While maintaining the knob 508 and these fingers in this counterclockwise position, the cam ring 544 is rotated counterclockwise (as viewed in FIG. 18) to retract the hooks 526 and thereby disengage the latch fingers 254' from their associated stops 408 in the cavity. This knob and thus the tang 506 may be rotated counterclockwise (as viewed in FIG. 18) until its pins 578 contact the stops or ends of the circumferential grooves in the handle collar 572 (which may be desirably about 12 degrees of rotation) which moves the locking plate 208' to the partially open position in which as shown in FIG. 23 the fingers 254' of the locking plate overlie the ends of the projections 406 in the cavity. To remove the specialty tool, the knob 508 continues to be maintained in its counterclockwise position while the cam ring 544 is rotated clockwise to extend the hooks generally axially inward of the fingers 254' of the locking plate, then the knob 508 is rotated clockwise so that the hooks 526 do not overlie these fingers, and then the tool 500 is pulled out or axially retracted and removed from the tamper resistant needle valve assembly. To move the locking plate 208' to its fully open position, thereby providing, as shown in FIGS. 17 and 25, access to the heads 222 of the needle valves through the holes 234 in the cover plate 210', another tool having a square tang or other configuration complimentary with the drive hole 248 is inserted through the cover access hole 236 and into the drive hole and then rotated counterclockwise. When the locking plate is moved to this fully open position, its fingers 254' return to an unflexed state in which they may overlap the projections 406 in the cavity and desirably the tongues 410 of the locking plate bear on the stop edges 420 in the cavity to accurately locate the holes 246 through the locking plate relative to the slots 230 in the heads 222 of the needle valves which desirably positions these holes 246 in a substantially coaxial relationship with the axis of rotation of an associated one of the needle valves as shown in FIGS. 17 and 25.

With the locking plate 208' in this fully open position, this another tool may be inserted through one of the cover plate holes to dispose its tang in the slot 230 of the head 222 of an associated needle valve and then this tool is rotated clockwise or counterclockwise to make the desired adjustment of the needle valve by an engine or carburetor manufacturer or an authorized dealer or factory representative.

After this adjustment of one or both of the needle valves 204 and 206, this same tool may be inserted through the cover plate central hole 236 and into engagement with the driving hole 248 of the lock plate 208' and then rotated clockwise to move the locking plate to its fully closed position to inhibit, and desirably prevent access to the needle valves. As the locking plate is rotated from its fully open to its fully closed position, its fingers 254' are moved generally axially outward toward the cover plate 210' by the cam surfaces 418 of the projections 406 in the cavity and then snap into overlapping and locking relationship with the stop surfaces 408 of the projections. In this locked position, portions of the locking plate at least partially and desirably completely cover or overlie the heads of the needle valves to inhibit and desirably prevent an end user from using any commercially available conventional tool to change the adjustment of either one or both of the needle valves.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A carburetor, comprising:
a body having a needle valve passage and a cavity open to the needle valve passage;
an adjustable valve having a head received in the cavity and a shank at least partly received in the needle valve passage;
a cover plate that is secured to the carburetor body over at least part of the cavity and which has a valve access hole therethrough; and
a disk received within the cavity between the body and the cover plate, the disk has an opening therethrough and the disk is rotatable between an open position and a closed position, the disk has a latch that engages at least one of the cover plate and the body in the closed position to inhibit or prevent rotation of the disk relative to the cover plate, and the latch is moveable relative to the cover plate to permit rotation of the disk from the closed position to the open position, wherein the opening and the valve access hole are at least partly aligned when the disk is in the open position permitting access to the adjustable valve through the valve access hole and opening, and wherein the opening and valve access hole are not aligned when the disk is in the closed position to inhibit or prevent access to the adjustable valve through the cover plate and disk.

2. The carburetor of claim 1 wherein the cover plate includes a latch hole and the disk includes a flexible finger that is received within the latch hole when the disk is in the closed position and wherein the finger is not within the latch hole when the disk is in the open position.

3. The carburetor of claim 2 wherein the latch hole is separate from the valve access hole.

4. The carburetor of claim 2 wherein the finger is integrally formed with the disk.

5. The carburetor of claim 1 wherein the cover plate includes a tool access hole spaced from the valve access hole and wherein the disk includes a receiver aligned with the tool access hole, the receiver being adapted to be engaged by a tool by which the disk is rotated.

6. The carburetor of claim 5 wherein the receiver is a non-circular opening in the disk.

7. The carburetor of claim 1 wherein the finger engages the cover plate when the disk is in the closed position, and the finger is capable of being flexed away from the cover plate to enable rotation of the disk relative to the cover plate, and the finger is resilient and returns to a position wherein the finger engages the cover plate when the disk is returned to the closed position.

8. The carburetor of claim 1 wherein the finger engages the body when the disk is in the closed position, and the finger is flexed toward from the cover plate to enable rotation of the disk relative to the body.

9. The carburetor of claim 8 wherein the body includes a cavity stop surface that is engaged by the finger when the disk is in the closed position.

10. The carburetor of claim 9 wherein the cavity stop surface is defined by a projection of the body that extends into the cavity, and wherein the projection includes a cam surface that flexes the finger so that the finger passes over the projection as the disk is rotated from the open position to the closed position.

11. The carburetor of claim 1 wherein the body includes a recess within the cavity that is defined in part by a first stop, and the disk includes an outwardly extending tongue received in the recess and engageable with the first stop to limit rotation of the disk.

12. The carburetor of claim 11 wherein the body includes a second stop spaced from the first stop and the tongue is received between the first stop and the second stop, and the tongue engages the first stop to limit rotation of the disk in a first direction and the tongue engages the second stop to limit rotation of the disk in a second direction.

13. The carburetor of claim 11 wherein at least part of the tongue is located radially farther from an axis of rotation of the disk than the latch.

* * * * *